US012810237B1

(12) United States Patent
Allen et al.

(10) Patent No.: US 12,810,237 B1
(45) Date of Patent: Nov. 24, 2026

(54) SYSTEM AND METHOD FOR AUTHENTICATED LOGISTICS

(71) Applicant: SnowGhost Inc., Whitefish, MT (US)

(72) Inventors: Brett Allen, Whitefish, MT (US); Ty Kennedy-Bowdoin, Redwood City, CA (US); Robert Frankenberg, Napa, CA (US)

(73) Assignee: SnowGhost Inc., Whitefish, MT (US)

( * ) Notice: Subject to any disclaimer, the term of this patent is extended or adjusted under 35 U.S.C. 154(b) by 7 days.

(21) Appl. No.: 19/330,861

(22) Filed: Sep. 17, 2025

Related U.S. Application Data

(63) Continuation-in-part of application No. 18/477,208, filed on Sep. 28, 2023, now Pat. No. 12,592,093.

(60) Provisional application No. 63/377,523, filed on Sep. 28, 2022.

(51) Int. Cl.
*G06Q 10/083* (2024.01)
*H04L 9/32* (2006.01)

(52) U.S. Cl.
CPC ....... *G06Q 10/0841* (2025.08); *H04L 9/3213* (2013.01)

(58) Field of Classification Search
CPC ............. G06Q 10/0837; G06Q 10/083; G06Q 10/087; G06Q 10/08; G06Q 10/0832; G06Q 10/0833
See application file for complete search history.

(56) References Cited

U.S. PATENT DOCUMENTS

| | | | | |
|---|---|---|---|---|
| 7,185,812 | B2 | 3/2007 | Wong et al. | |
| 7,530,494 | B1 * | 5/2009 | Streelman .......... | G06K 17/0022 705/28 |
| 7,755,518 | B2 | 7/2010 | Hersh et al. | |
| 8,050,976 | B2 | 11/2011 | Staib et al. | |
| 8,484,080 | B2 | 7/2013 | Sneyders | |
| 9,378,431 | B2 | 6/2016 | Stoeffler et al. | |
| 9,984,329 | B2 | 5/2018 | Winnick | |

(Continued)

OTHER PUBLICATIONS

Hepp et al., "Securing Physical Assets on the Blockchain," Association for Computing Machinery, Jun. 15, 2018, Retrieved from https://dl.acm.org/doi/pdf/10.1145/3211933.3211944 (Year: 2018).*

*Primary Examiner* — Bryan J Kirk
(74) *Attorney, Agent, or Firm* — NetLawyers LLP

(57) ABSTRACT

A system and method for integrated logistics orchestration and decentralized support decisioning. The system executes a guided triage sequence on a capture device to evaluate a support request for a physical item linked to a digital provenance ledger. Based on policy rules, the system determines a support outcome, such as a no-ship resolution or a return authorization. If a return is authorized, the system generates a time-scoped and geo-scoped handoff authorization token for an authorized drop-off location. The system enforces a packaging certification protocol requiring verification of specific packaging material SKUs and media capture. Generation of a shipping label and binding of insurance are authorized only upon successful certification. The system records the custody transfer by validating the handoff authorization token, scanning the item's unique identifier, verifying the actor's role, and confirming the location within the handoff authorization token's geofence.

16 Claims, 29 Drawing Sheets

(56) References Cited

U.S. PATENT DOCUMENTS

| | | | | |
|---|---|---|---|---|
| 10,277,950 | B2 | 4/2019 | Saxena et al. | |
| 10,296,880 | B2 | 5/2019 | Miller | |
| 10,621,675 | B1 | 4/2020 | Genser et al. | |
| 10,825,090 | B2 | 11/2020 | Saigh et al. | |
| 10,915,749 | B2 | 2/2021 | Ross et al. | |
| 11,232,549 | B2 | 1/2022 | Narasimha-Iyer | |
| 11,276,095 | B1 | 3/2022 | Jacobs, II | |
| 11,311,797 | B2 | 4/2022 | Rose et al. | |
| 11,455,714 | B2 | 9/2022 | Mok et al. | |
| 12,238,232 | B1 | 2/2025 | Steel | |
| 12,361,366 | B1 * | 7/2025 | Srinivas | G06N 20/20 |
| 12,387,226 | B2 | 8/2025 | Sampat et al. | |
| 2012/0253977 | A1 | 10/2012 | Mesaros | |
| 2014/0095264 | A1 | 4/2014 | Grosz | |
| 2014/0226024 | A1 * | 8/2014 | Limbaugh | H04N 23/62 348/169 |
| 2014/0279616 | A1 | 9/2014 | Aoki | |
| 2017/0262862 | A1 | 9/2017 | Aljawhari | |
| 2018/0053069 | A1 | 2/2018 | Kale et al. | |
| 2019/0019144 | A1 * | 1/2019 | Gillen | H04L 9/3236 |
| 2019/0066190 | A1 | 2/2019 | Pedroso et al. | |
| 2020/0107150 | A1 | 4/2020 | Jensen et al. | |
| 2021/0150611 | A1 | 5/2021 | Morin et al. | |
| 2021/0258144 | A1 | 8/2021 | Minier | |
| 2022/0198387 | A1 | 6/2022 | Hansen et al. | |
| 2023/0410073 | A1 | 12/2023 | Piexoto | |
| 2024/0086977 | A1 * | 3/2024 | Rendahl | G06Q 10/0837 |
| 2025/0069094 | A1 | 2/2025 | Weigold et al. | |

* cited by examiner

SYSTEM AND METHOD FOR AUTHENTICATED LOGISTICS

CROSS-REFERENCE TO RELATED APPLICATIONS

The present application is a continuation-in-part of U.S. patent application Ser. No. 18/477,208 filed on Sep. 28, 2023, by Brett Allen, Matthew Crest, William Mitsakos, Ty Kennedy-Bowdoin, and Kim Brandwijk, titled "Immutable Chain of Physical Object Provenance", which claims the benefit of U.S. Provisional Application No. 63/377,523 filed Sep. 28, 2022, by Brett Allen and William Mitsakos, titled "Secure Non-Fungible Token Management System", which is included by reference herein and for which benefit of the priority date is hereby claimed. The present application is related to U.S. patent application Ser. No. 19/096,519 filed on Mar. 31, 2025 by Brett Allen, Matthew Crest, Ty Kennedy-Bowdoin and Kim Brandwijk, titled "Multifactor Provenance System for Physical Objects", U.S. patent application Ser. No. 19/199,612 filed on May 6, 2025 by Brett Allen, Matthew Crest, Ty Kennedy-Bowdoin, Kim Brandwijk, and Aubrey Anderson titled "Blockchain Provenance System for Physical Objects", and U.S. patent application Ser. No. 19/314,200 filed on Aug. 29, 2025 by Brett Allen, Matthew Crest, Kim Brandwijk, Ty Kennedy-Bowdoin and Benedict O'Mahoney, all of which are a continuation-in-part of U.S. patent application Ser. No. 18/477,208 filed on Sep. 28, 2023, by Brett Allen, Matthew Crest, William Mitsakos, Ty Kennedy-Bowdoin, and Kim Brandwijk, titled "Immutable Chain of Physical Object Provenance", and which are included by reference herein.

FEDERALLY SPONSORED RESEARCH

Not applicable.

SEQUENCE LISTING OR PROGRAM

Not applicable.

FIELD OF INVENTION

The present invention relates generally to computer-implemented logistics and supply chain management, and more particularly to systems and methods for verifiable chain-of-custody tracking, enforced packaging compliance, and decentralized decision-making for product support and reverse logistics.

BACKGROUND OF THE INVENTION

The management of logistics, supply chain integrity, and post-sale support presents significant challenges, particularly for high-value, fragile, or unique items. As physical goods move through modern e-commerce networks, they pass through numerous actors—including sellers, various logistics providers, packaging centers, and buyers—and require multiple physical handoffs. Maintaining a verifiable chain of custody and ensuring the condition of the item at each stage is critical, yet conventionally difficult to achieve with high fidelity.

Conventional systems for tracking provenance and custody often utilize unique identifiers, such as barcodes or radio-frequency identification (RFID) tags, linked to centralized databases or distributed ledgers. These systems record transaction events as items move through the supply chain. However, these records often represent only claims of events rather than verifiable proof. For instance, a carrier may record a successful handoff, but the system typically lacks independent, technologically enforced verification of the precise location (geofencing), the identity and authorization (role) of the actor performing the handoff, or the condition of the item at that exact moment. This reliance on unverified claims creates visibility gaps, frequently leading to disputes regarding liability when items are lost or damaged in transit.

Furthermore, a major source of loss during shipment is inadequate or improper packaging. In conventional logistics workflows, the quality of packaging is highly variable and generally unverified by the logistics provider or insurer before the item enters the transit stream. Shippers may use inadequate materials, reuse compromised containers, or fail to follow best practices. While some automated systems exist for inspecting package contents to ensure order accuracy (e.g., verifying that the correct product is in the box), they typically do not enforce compliance with specific protective packaging recipes or verify the quality and type of the materials used (e.g., enforcing the use of new boxes).

This lack of verifiable data regarding packaging quality creates significant challenges in the insurance industry. Traditionally, cargo insurance is bound based on probabilistic risk models that consider factors such as the item's declared value, the route, and the carrier's history. Because the insurer cannot verify the protective quality of the packaging for a specific shipment in real-time, the underwriting process must assume a baseline level of risk associated with improper packing. This fundamental disconnect between the physical preparation of the item and the binding of the insurance policy leads to higher premiums and complex, often contested, claims adjudication processes, as insurers lack objective, time-stamped evidence of the item's condition and packaging at the point of origin.

Inefficiencies are also prevalent in reverse logistics and product support processes, including returns, refunds, and repairs (R/R/R). When a consumer reports an issue, the conventional approach often requires the consumer to ship the item to a centralized depot for evaluation. This "return first, triage later" model is slow, incurs significant shipping and handling costs, and frequently results in resolutions (like a partial credit or field repair) that did not necessitate a shipment.

While automated troubleshooting and remote diagnostic tools exist, these systems are fundamentally limited because they typically rely entirely on evidence provided by the consumer after the incident. They lack access to a trusted, longitudinal history of the item's condition and handling prior to the incident (e.g., the initial state or the verified packaging state). This lack of historical context limits the accuracy of automated decision-making, increases the potential for fraudulent claims, and often forces the system to default to authorizing a costly return shipment. The prior art is characterized by siloed solutions: tracking systems that lack verifiable physical evidence, insurance models disconnected from real-time risk mitigation actions, and support systems operating without historical context.

There are many platforms for the online sale of physical objects. Serial numbers, barcodes, RFID tags, and similar physical object identifiers exist for one main reason: to know what object they are attached to. They work well for mass produced items or in a controlled environment but are either not durable enough to last for years or prove incompatible with unique objects. Blockchain provides verification and traceability (trust) of data by way of an immutable ledger.

While it has proven a viable and valuable technology for many industries, unfortunately it relies on data being in a digital format.

The difficulty is increased with regard to establishing provenance for physical objects that are unique. The world of collectibles, be it art, rare coins, stamps, or even limited-edition sneakers, holds significant cultural and financial value. Ensuring the authenticity, provenance, and ownership of these objects has always been a priority for collectors, dealers, and museums.

Traditionally, the process of validating the authenticity of a collectible largely depended on expert judgment, physical certificates of authenticity, and intricate databases. These methods, although effective to some extent, come with challenges. For example, experts can sometimes have conflicting opinions. Physical certificates can be duplicated or faked. Centralized databases can be manipulated if not secured properly.

In many industries, for example collectibles, apparel, art, musical instruments, etc., the ability to verify an item's authenticity and condition over its lifetime is crucial. Traditional identification methods often confirm whether an item received matches the one shipped, but they do not account for changes that happen over time. What is needed is a system to addresses this gap by not only verifying an item's identity but also documenting any modifications or additions that develop as the item evolves.

Online marketplaces and platforms commonly facilitate the exchange of goods and digital content. These systems allow individuals to engage in various commercial activities, such as buying and selling products, often through consumer-to-consumer secondary sales. In the realm of digital assets, technologies like non-fungible tokens (NFTs) have emerged, providing a unique digital identity and a verifiable history of ownership for digital content on a blockchain. Additionally, e-commerce platforms offer tools for managing sales, setting prices, and sometimes even gathering limited customer data and product reviews.

In the contemporary online marketplace, buying and selling collectibles largely relies on centralized listing platforms that use a classic client-server model. Sellers upload images and descriptions to databases indexed by item attributes, and buyers navigate these listings through search engines that filter by keywords or category. Payment flows typically involve standardized checkout processes, allowing for near-instant purchases or "Buy It Now" transactions that finalize a sale with minimal friction. Auction-based variations add competitive bidding, but still center on a fixed-duration event where the highest bidder wins at the close. Once a transaction is completed, the listing often vanishes or is archived, ending the item's active presence on the site and severing any structural link to further resale or historical documentation. In this model, the original creator of an item usually receives compensation only from the initial sale, missing out if the piece later appreciates in value. Furthermore, even though some sellers provide backstories or personal anecdotes, the platforms themselves tend not to focus on capturing the deeper narrative that underpins many collectibles.

The market for unique and high-value physical items has long relied on conventional methods to establish authenticity and track ownership history, a process known as establishing provenance. The most common of these methods is the use of physical documentation. A paper-based Certificate of Authenticity (COA), often issued by the artist, a gallery, or a recognized expert, typically accompanies an item. The item's history is further documented in auction catalogues, bills of sale, and inclusion in an artist's catalogue raisonné—a comprehensive, annotated listing of all their known works.

These documents are often managed by centralized institutions such as auction houses, galleries, museums, or artist foundations, which maintain proprietary databases to record transactions and historical data. The value and integrity of an item are directly tied to the quality and completeness of this paper trail.

Another common avenue for collectors involves private sales or classifieds, facilitated by social media groups, forums, or dedicated listing sites with minimal support for structured transactions. Here, buyers and sellers negotiate terms directly, often in one-on-one communication. This flexibility can be advantageous for those who prefer a more personalized approach, but it also introduces risks related to payment security and authenticity verification. Because these interactions unfold in less centralized environments, there is rarely a built-in mechanism to track and document each item's ownership history. This can be particularly problematic with valuable or rare collectibles, where the provenance can have a substantial impact on an item's worth.

Despite the various pathways for trading collectibles—fixed-price listings, auctions, and private negotiations—there are notable inefficiencies from a technological standpoint. Provenance data that could confirm an item's authenticity or trace its journey from creator to successive owners is seldom captured or displayed in a user-friendly manner. Once an item changes hands, the trail of ownership often disappears into offline exchanges, private messages, or archived listings. As a result, buyers who encounter the collectible in a subsequent sale may have little means to confirm its origin, condition, or authenticity. Meanwhile, artists or original creators rarely receive any share of the growing value if the collectible appreciates over time.

Additionally, with regard to provenance tracking, many methods attempt to track objects over time. Serial numbers, barcodes, RFID tags, and similar physical object identifiers exist for one main reason: to know what object they are attached to. They work well for mass produced items or in a controlled environment but are either not durable enough to last for years or prove incompatible with unique objects. Blockchain provides verification and traceability (trust) of data by way of an immutable ledger. While it has proven a viable and valuable technology for many industries, unfortunately it relies on data being in a digital format.

The difficulty is increased with regard to establishing provenance for physical objects that are unique. The world of collectibles, be it art, rare coins, stamps, or even limited-edition sneakers, holds significant cultural and financial value. Ensuring the authenticity, provenance, and ownership of these objects has always been a priority for collectors, dealers, and museums.

Traditionally, the process of validating the authenticity of a collectible largely depended on expert judgment, physical certificates of authenticity, and intricate databases. These methods, although effective to some extent, come with challenges. For example, experts can sometimes have conflicting opinions. Physical certificates can be duplicated or faked. Centralized databases can be manipulated if not secured properly.

In many industries, for example collectibles, apparel, art, musical instruments, etc., the ability to verify an item's authenticity and condition over its lifetime is crucial. Traditional identification methods often confirm whether an item received matches the one shipped, but they do not account for changes that happen over time. What is needed is a system to addresses this gap by not only verifying an item's identity but also documenting any modifications or additions that develop as the item evolves.

With existing systems, provenance data is generally underutilized. Existing platforms do not uniformly capture or display an item's lifecycle. This data is critical for authenticating collectibles. Additionally, there is limited engagement post-sale. Items are typically delisted, which hinders ongoing interest and the potential for further resale. There is also an artist compensation gap. In almost all mainstream models, once an item leaves the artist, any increase in value from subsequent sales benefits only sellers. And finally, pricing structure are inflexible. Sellers (including creators) must commit to a price (fixed or auction format), complicating valuations for one-of-a-kind or personally significant items.

It is therefore an objective of the present invention to provide a system and method for integrated logistics orchestration that enforces verifiable chain-of-custody protocols using localized constraints, technologically mandates evidence-based packaging compliance as a prerequisite for shipment and insurance binding, and enables decentralized support decisioning at the consumer edge utilizing a longitudinal provenance record.

SUMMARY OF THE INVENTION

The following section provides detailed definitions and potential embodiments for key terms used in the claims of the present invention. This description is intended to provide a person ordinarily skilled in the art with a full and enabling disclosure of the invention.

The "platform" refers to the integrated hardware and software architecture that delivers the functionality of the invention. In a preferred embodiment, the platform utilizes a hybrid architecture. A centralized server system, comprising web servers, application servers, and databases, manages user accounts, password authentication, profile information, and serves the graphical user interface (GUI) to users' devices. This centralized component handles critical data and computationally intensive tasks like image and video processing. The core transactional and ownership logic is handled by a decentralized component, namely a smart contract ecosystem deployed on a distributed ledger. This hybrid approach leverages the efficiency and user-friendliness of centralized systems for the user experience, while relying on the security, immutability, and trustless automation of decentralized systems.

A "capture device" is a device capable of capturing images and relaying information to the platform. Typically this is a consumer edge device or smartphone.

A "digital twin" is a unique, dynamic digital record that is inextricably and verifiably linked to a specific physical item. It is more than a static database entry; it is a living document that evolves over the item's lifecycle. The digital twin comprises two primary data categories: provenance data, which is the objective and factual history of the item (e.g., creation materials, ownership changes, condition changes), and experiential data, which is the subjective, narrative history contributed by its owners (e.g., stories, anecdotes, photos of the item in new contexts). The digital twin is embodied technically as a non-fungible token (NFT), which serves as the vehicle for its ownership, transfer, and the programmatic execution of its associated rules, such as royalty payments.

The "originator" is the individual or entity that creates the item and/or initiates its journey on the platform. This is typically the artist, designer, or craftsperson. The originator provides the initial, canonical provenance and experiential data that forms the basis of the digital twin. The system is designed to ensure the originator is authenticated to prevent fraudulent creation of digital twins for items they did not create or own. The originator is also the permanent beneficiary of the royalty mechanism, ensuring they participate in the ongoing economic life of their creation.

"Provenance data" refers to the set of verifiable, objective data that constitutes the formal history and background of an item. This includes, but is not limited to: the date and location of creation, a detailed list of constituent materials, certificates of authenticity, professional appraisals, conservation reports, a complete and unbroken chain of ownership with transaction dates and sale prices, and a record of public exhibitions or publications in which the item has been featured.

The "originator identifier" is the unique ID that identifies the originator on the platform. It can be as simple as an identity field in a database, or a digital credential used to authenticate the originator on the platform. In one embodiment, this is a multi-part identifier combining a cryptographic key pair (i.e., a public blockchain wallet address) with a verified platform account. The platform may perform a one-time verification process, linking the wallet address to a real-world identity through methods such as social media account verification, documentation review (Know Your Customer/KYC), or by cross-referencing with established professional registries. This ensures that the wallet address designated to receive perpetual royalties is verifiably linked to the correct creator.

A "distributed ledger" (or "blockchain") is a decentralized, immutable, and transparent digital logbook. It is the foundational technology upon which the digital twin's integrity rests. Its primary functions in the system are: 1) to provide an unchangeable and publicly verifiable record of every ownership transaction; 2) to host and execute the smart contracts that govern the rules of the digital twin (e.g., ownership transfers); and 3) to ensure that control over the digital twin rests solely with the owner of the corresponding private key, eliminating the need for a central intermediary to broker trust. The system may be built upon a public blockchain such as Ethereum or a similar smart contract-enabled platform.

A "non-fungible token" ("NFT") is the technical implementation of the digital twin. It is a unique cryptographic token on a blockchain that represents ownership of the digital twin and, by extension, serves as the certificate of authenticity and ownership for the associated physical item. The NFT's smart contract contains certain logic: the transfer function that changes ownership, in some embodiments, the royalty payment function, and pointers to the off-chain storage where the detailed provenance and experiential data are kept. It adheres to a standard like ERC-721 or ERC-1155 to ensure interoperability across the blockchain ecosystem.

The "graphical user interface" ("GUI") is the web or application interface through which users interact with the platform. It is designed with different views tailored to the user's role. For an originator, the GUI can provide a form to mint a new digital twin and a dashboard to track the sales history and accrued royalties for their creations. For a current owner, the GUI can display their collection, provide an interface to add new experiential data, and a simple form to list an item for sale. For a potential buyer, the GUI is a marketplace to browse items, view their complete historical digital twin (both provenance and experiential data), and place offers.

"Consummation of a sale" defines the specific point at which a sale is considered final and the system's automated functions are triggered. In one embodiment, it is not merely the verbal agreement but a technical event within the platform's smart contract. It is an atomic transaction wherein the following occur simultaneously: 1) the buyer's funds are irrevocably transferred from their account or an escrow contract; 2) the platform's sale commission is taken; 3) the royalty payment is sent to the originator; 4) the remainder of the funds are sent to the seller; and 5) the item's NFT is transferred to the buyer's wallet. In one embodiment, if any one of these steps fails, the entire transaction automatically reverts, and no funds or assets change hands.

A "handoff authorization token" is a time-boxed and geo-scoped token that authorizes a custody event.

"Edge decisioning" refers to support decision that are made at the consumer's device before support action is taken.

The present invention provides a comprehensive system and method for orchestrating logistics, ensuring chain-of-custody integrity, and automating support decisions for physical items. The system integrates several technological layers to create a verifiable, end-to-end digital thread for each item, linking physical actions (handoffs, packaging) directly to digital and financial outcomes (custody recording, insurance binding, support resolutions). The architecture is designed to mitigate risk, reduce fraud, and eliminate inefficiencies inherent in conventional logistics and reverse logistics processes.

The system architecture comprises several integrated modules, built upon a foundational identity and provenance layer. Each physical item managed by the system is assigned a unique identifier. This ID is linked to a digital provenance ledger, which serves as an immutable registry of the item's lifecycle. The ledger records ownership details, transfer events, and condition snapshots, including associated time-stamped media artifacts (photos, videos, sensor data). This ledger provides the persistent "source of truth" utilized by all other modules in the system.

Building upon this foundation is the chain-of-custody layer, which implements a strict "check-in/check-out" protocol to manage physical handoffs. Unlike conventional systems that merely record claims of handoffs, this invention enforces a multi-factor verification protocol for every custody transfer event. To successfully record a handoff, the system requires the convergence of: (1) a verification scan of the item (2) verification of the actor's role (e.g., merchant, carrier associate, driver, buyer) via authenticated credentials; and (3) confirmation that the scan occurred within a predefined geofence associated with the authorized location for that specific transfer. If any factor fails validation, the handoff is programmatically blocked.

Furthermore, the chain-of-custody protocol mandates the capture of condition reports and media artifacts at each event. If a condition delta (discrepancy) is detected—either manually reported or automatically detected via image analysis or sensor data—the system triggers exception handling workflows. For example, if a package is noted as damaged during a carrier-to-carrier transfer, the system automatically triggers a requirement for extra media capture. Similarly, if a mismatched item is scanned during intake, the handoff is blocked, and supervisor intervention is required, preventing erroneous items from propagating through the supply chain.

The logistics orchestration layer manages the initiation and execution of shipments, introducing novel mechanisms for authorization and risk mitigation. Shipments are initiated using handoff authorization tokens. A handoff authorization token is a digitally generated, single-use token that is both time-scoped (short-lived) and geo-scoped (valid only at a specific, approved drop-off location, such as a certified carrier store). When a shipment is authorized (e.g., post-sale or authorized return), the system mints a handoff authorization token. The actor must utilize the handoff authorization token at the designated location within the valid time-frame to initiate the drop-off process, providing a secure and localized authorization mechanism.

The logistics orchestration layer is implements the packaging certification protocol. This protocol technologically enforces standardized, high-quality packaging tailored to the specific risk profile of the item. The system determines a risk tier for the item based on factors such as size, weight, fragility, and uniqueness, and assigns a corresponding packaging recipe (e.g., double-boxing, specific foam density, corner guards). Compliance is enforced through a guided workflow, typically implemented via an associate application used by certified packers.

The packaging certification protocol enforces compliance by requiring the operator to scan the stock keeping unit (SKU) identifiers of the packaging materials used. The system verifies that these SKUs match the approved materials for the recipe and explicitly prohibits the use of non-approved materials, such as reused boxes. The protocol further mandates the capture of a specific sequence of photographic evidence (e.g., item seated in packaging, pre-seal interior, sealed exterior with label). In one embodiment, upon successful completion, the system may issue a unique Seal ID, linking the physical package to the digital certification record.

The execution of subsequent logistics and financial processes is gated by the successful completion of the packaging certification. The generation of the shipping label and the binding of the insurance policy are programmatically authorized only when the system verifies full compliance with the protocol. This creates a direct, causal link between a deterministic risk-mitigation action (verified packaging) and the assumption of financial risk (insurance binding). Furthermore, for high-risk tiers, the system enforces non-optional policies, such as mandatory signature-required delivery. The evidence bundle generated during certification (SKU data, photos, Seal ID) is appended to the provenance ledger.

Embodiments of the invention further include a support decision engine designed to decentralize and automate Return/Refund/Repair (R/R/R) processes. This engine shifts the triage and decision-making process from a centralized depot to the consumer's edge device. When a consumer initiates a support request (e.g., by scanning the item), the engine executes a guided triage sequence. This sequence prompts the consumer to capture specific evidence (photos/videos of the issue) and perform item-specific diagnostic tests.

The Support Decision Engine then evaluates the captured evidence, in conjunction with the rich historical data already present in the provenance distributed ledger (e.g., initial condition photos, packaging certification evidence), against predefined support policy rules. Based on this evaluation, the engine determines the optimal support outcome before authorizing a shipment. Outcomes include no-ship resolutions (e.g., partial credit, keep-it refund), field repair (shipping a part or toolkit), or, if necessary, an authorized return. If a return shipment is required, the system automatically invokes the logistics orchestration layer to issue a handoff authorization token and enforce the package certification protocol for the return journey. This edge-based decisioning significantly reduces unnecessary shipments and associated costs.

The provenance layer is supported by a system for creating and managing a persistent, dynamic digital identity for physical items, and more particularly to a system that tracks an item's entire lifecycle of ownership, experience, and transactions.

Computer vision is the ability of computers to interpret and make decisions based on visual data. It can enhance the ability to track physical collectibles through digital fingerprinting, image recognition and continuous verification. With digital fingerprinting, just as every human has a unique fingerprint, every physical object has minute details that can serve as its unique identifier. Computer vision can capture these details, creating a 'digital fingerprint'.

With image recognition, using trained models, computer vision can differentiate between a genuine collectible and a fake, by comparing an object's digital fingerprint against a database of known authentic pieces. With continuous verification, with mobile apps, collectors can frequently scan their pieces to verify their authenticity.

Computer vision and artificial intelligence technologies offer a new paradigm for tracking unique physical objects. The present invention integrates computer vision's capability to create digital fingerprints, resulting in a powerful system for the collectibles industry. Verification and registration is provided wherein collectibles can be scanned using computer vision to create a digital fingerprint. This fingerprint, along with details about its origin, date of creation, and more, is then registered and tracked over the lifetime of the object.

Transfer of ownership can be securely documented; when a collectible is sold, the provenance record is updated, and the new owner can verify the object using its digital fingerprint. Fraud prevention is inherent as any attempt to sell a counterfeit will be caught when its digital fingerprint doesn't match the provenance records.

The multi-factor provenance layer is a cloud-based platform designed to verify and establish the authenticity, provenance, and identity of unique physical objects such as collectibles through digital images and associated provenance information. The system employs a combination of image capture, advanced image processing, feature identification, segmentation, masking, and machine learning-based matching techniques to ensure that an authenticated object can be reliably recognized over time and through subsequent interactions.

In some embodiments, the provenance layer comprises several interconnected components. The processing component orchestrates the capture component, masking component and matching component. The capture component handles secure image ingestion, initial validation, metadata extraction (including EXIF and geolocation data), and preparation for downstream processing. The segmentation component performs image segmentation, feature extraction, and compositing steps to ensure a high-quality baseline image (referred to as the "golden image") is stored. The masking component generates masks that isolate the collectible from the background, enabling more accurate feature detection and matching. The matching component compares candidate images against previously stored golden images and masks to confirm whether the candidate represents the same object. The datastore holds images, metadata, features, masks, embeddings, and blockchain-based provenance records.

The provenance layer's initial operation can be viewed as a three-step process. The first step is origin processing which entails acquisition of the initial origin image of the object, capture of feature information, generation of an origin mask, and storage of these results. The second step is candidate processing which entails the acquisition of a subsequent candidate image of an object purported to be the same object. The system performs similar segmentation, masking, and preparation steps to produce a candidate mask. The third step is match processing which entails comparing the candidate image and mask against the stored origin data to determine whether the candidate represents the same object. This process can be repeated to track the provenance of the object over time.

Origin processing involves capturing the origin image using a consumer edge device or capture device which is typically a smartphone equipped with a camera and the platform's mobile application. The app provides an on-screen bounding box overlay to guide the user in framing the object. Distance adjustments, pinching, and zooming help align the object optimally. Once the user or the app (via an automatic trigger) captures the image, it is transmitted to the processing component. To improve quality, the system may capture multiple images in quick succession (e.g., a second image 0.1 to 1 second after the first) to assist with focus stacking or compositing techniques. In some embodiments, the app determines when optimal alignment is reached and automatically takes the picture.

After capturing the origin image, the user can identify specific features by dropping pins or tapping on the displayed image. Each feature can be associated with a description and category. These user-defined features serve as prompts to the segmentation component, improving mask accuracy and contextual understanding. Geolocation, device timestamp, and device-based EXIF data can be recorded. This contextual data (exposure, ISO, white balance) can help assess image quality or guide image processing steps.

In one embodiment of the present invention, the application sends the following payload to the processing component: origin image (potentially cropped or blurred outside the bounding box), originator ID information, origin geolocation, feature image(s), feature locations and descriptions, and origin and feature stories.

The processing component leverages a segmentation component, in one embodiment using transformer-based vision models or semantic/instance segmentation approaches, to produce a segment image (object isolated from the background), a segment mask (binary or pixel-level delineation), a segment cutout (extracted collectible region) and a confidence factor for the segmentation result.

If multiple segmentation results are returned, either the segmentation component or the processing component selects the one with the highest confidence factor. The chosen mask and image are designated as the "golden image" and "golden mask" and are stored in the datastore. Relevant metadata, including prompts and originator info, may be recorded on a blockchain for immutable provenance.

Candidate processing involves capturing a candidate image in a similar manner. It goes through analogous steps of alignment, masking, and feature identification. Additional cutout alignment and candidate masking steps ensure that the candidate image is prepared similarly to the origin.

The system compares candidate masks and embeddings to the stored golden mask and origin image. Feature-level matching and embedding comparison confirm whether the candidate image represents the same physical object. The result (match or no match) is then returned, along with confidence metrics.

In one embodiment, to achieve a high-quality reference image, multiple images may be captured at varying focal lengths. A focus stacking algorithm selects the sharpest pixels from each image. Gaussian blur techniques help determine depth and identify the best pixels for composite images. HDR exposure can be employed for better lighting balance.

In one embodiment, homography transformations adjust the entire image frame to align multiple images or improve subsequent segmentation accuracy. By optimizing exposure and other camera parameters and through image enhancement techniques, the system can ensure that the stored origin and candidate image is both accurate and visually clear. EXIF data such as exposure, ISO speed, and white balance can inform processing steps. Low-light conditions, reflections, or hotspots can trigger warnings to guide users toward improved capture conditions.

In other embodiments, users can adjust distance or use pinch-to-zoom to fit the collectible in a bounding box overlay; a global zoom feature may trim the outer edges to maintain cleanliness and prevent over-zooming. Users can drop pins on the displayed origin image to mark feature locations, add feature descriptions, and optionally assign categories. In other embodiments collecting multiple images may be used to address initial poor image quality and enable better focus stacking and compositing. Originators can add personal stories, emotional value indices, and other contextual information to enhance provenance records.

In other embodiments, incorporation of classification models may be used to identify the object type, LLMs (Large Language Models) may be used to summarize origin stories and feature stories. AI-based content moderation and inappropriate content screening can be utilized.

In one embodiment, offline capture modes allow users to gather data in low-connectivity environments, storing information locally until a stable internet connection is established. Meanwhile, asynchronous processing ensures that no single operation blocks another, preventing timeouts and improving reliability.

In one embodiment, the onboarding process offers bulk onboarding options, enabling multiple items to be processed simultaneously. Users can indicate important features by simply dropping points rather than drawing complex boxes, reducing interface clutter and the risk of overlapping regions. Over time, as rescans occur, users may need to adjust feature locations. This user-driven iterative refinement process enables the system to stay current with the object's state across transfers of ownership or changes in condition.

Provenance is ensured on the platform through the refinement of feature scoring, mask generation, and the interplay of origin scans, golden images, and candidate comparisons. By improving resolution and detail at the feature level, and by leveraging advanced segmentation and matching workflows, the system enhances both the precision and reliability of object verification over time.

In one embodiment, the system reduces the overall object similarity into a single metric. In one embodiment, implementing a higher resolution of detail at the feature level, the platform can identify and evaluate each meaningful characteristic of the object independently. The scoring analysis, done after the matching step on the processing component, allows for more nuanced judgment. As threshold adjustments and improved scoring algorithms are applied over time, the system can automatically filter out certain failure modes and ensure that only robust and reliable features contribute to the final outcome.

In one embodiment, when an origin image is first received by the processing component, it triggers an asynchronous origin masking process. The server transmits the origin image and at least one prompt, such as a bounding box, feature descriptions, or locations, to a segmentation component employing the Segment Anything Model (SAM) or similarly sophisticated segmentation algorithms. The segmentation component returns one or more potential masks, each with its own segment image, segment mask, segment cutout, and a confidence factor indicating the quality of the segmentation result.

If multiple masks are produced, the system selects the mask with the highest confidence factor and designates it as the "golden mask." The associated image becomes the "golden image." This golden mask and golden image serve as canonical references for the object, capturing its authenticated state at the moment of origin. Alongside the golden mask, the processing component stores additional information, such as originator ID, geolocation data, and any prompts used during segmentation, on a blockchain, ensuring an immutable record of provenance. The chosen segmentation strategy, whether zero-shot, bounding box-based, point-based, or a combination of these approaches, can vary depending on the complexity of the object and the desired accuracy.

The origin masking step ensures that the object can be isolated from its background consistently. This provides a clear starting point for future verification efforts, as later candidate images can be compared directly against this well-defined and authenticated baseline. By leveraging semantic or instance segmentation, the system can recognize an object's unique attributes even when environmental conditions, camera angles, or lighting scenarios change over time.

Moreover, the notion of a "golden image" as the latest approved scan of an object introduces a dynamic reference point for comparison. In one embodiment, the platform compares candidates against both the initial origin scan and the most up-to-date golden image. By doing so, the system can account for changes over time, distinguishing naturally occurring variations in the object's appearance from anomalies that might indicate tampering or misidentification. This dual-reference method also helps manage complications arising from inferior intermediate scans and allows the system to update and refine features as the object's state evolves. In practice, once a buyer assumes ownership, any newly introduced features or recognized changes in appearance can be factored into the verification process without relying solely on the original, potentially outdated image.

In one embodiment of the present invention, the segmentation component uses the Segment Anything Model (SAM), the platform's mask generation process uses prompt encoders, bounding boxes, and user-defined points to produce multiple masks for each image. This capability to generate up to eight masks allows the system to select the best one, providing a sharper, more focused representation of the object. In one embodiment, text prompts can be used to guide segmentation. The system provides a robust segmentation approach that can isolate the object from its background reliably, even as conditions vary from scan to scan.

Once masks and embeddings are in place, the matcher component takes on the job of establishing a correspondence between the golden image and the candidate image. The processing component invokes the matcher with the relevant IDs and masks. After downloading the necessary images from storage, the system identifies thousands of potential feature points and filters them for quality. With this foundation, the matcher calculates a homography, a perspective transformation, that aligns the candidate image with the golden one. This alignment allows the system to correctly place user-defined features on the candidate image, making it possible to verify whether these features match expected characteristics from the golden image.

In one embodiment, matching done using a grayscale pipeline for simplicity and robustness against lighting changes. In one embodiment, matching is done across multiple color channels. By comparing red, green, and blue channels individually, the system can handle objects with subtle color differences, variations in lighting, or intentional coloration attempts by counterfeiters. In one embodiment, matching includes comparing color histograms or leveraging cost-effective color-difference measurements.

The processing component orchestrates a series of steps involving data fetches, embedding checks, mask requests, and database updates. In one embodiment, multiple internal database tables store segmentation attempts, captures, feature locations, match results, and summary data. In one embodiment, once masks and embeddings are generated, they are processed and sent through queues for asynchronous database updates. Parallel processing strategies such as concurrent image generation, multi-image downloads, and message batching in queues contribute to improved performance and scalability.

The segmentation component supports automatic and prompt-guided approaches, can produce binary masks that can be displayed as previews, and produce cutouts tailored to various downstream applications. In one embodiment, the system uses domain-specific segmentation models for improved accuracy on specialized objects. In one embodiment, the system develops interactive segmentation workflows for human-in-the-loop adjustments, or adopts ensemble methods to further improve robustness.

In one embodiment, the system's segmentation component can be guided by various prompts to enhance accuracy. By passing contextual information such as bounding boxes, feature descriptions, or narratives (origin stories) related to the collectible, the model can better understand the domain and object type. This guided approach helps avoid common pitfalls like overfitting or misidentification, as the model can rely on hints and prompts to produce more meaningful masks. Over time, the system's dependency on explicit features may lessen as it learns to consistently identify and isolate objects using generalizable patterns.

In one embodiment, in parallel with generating the golden mask, the platform enables other AI-driven capabilities such as measuring the object's dimensions, classifying its type, and even capturing verbal descriptions or stories that can be summarized with a language model.

When verifying a candidate image, the processing component initiates a candidate masking process that parallels the origin masking workflow. The candidate image is captured using a similar smartphone interface and may display the previously created golden cutout overlayed on the device's screen. This overlay helps the user align the candidate object consistently with the original captured state of the collectible.

Once the candidate image and prompts (which may include the golden mask, feature descriptions, and feature locations) are sent to the segmentation component, one or more candidate masks are returned, each with its own confidence factor. As with the origin masking process, the processing component selects the mask with the highest confidence factor. In one embodiment, the resulting candidate mask and segment cutout are stored for subsequent comparison against the golden image. This ensures that the comparison step is based on the best possible representation of the candidate object, free from unnecessary background noise or extraneous elements.

With both origin and candidate masks generated, the system proceeds to the matching phase. Here, it compares the masked candidate image to the golden image. Feature-level scoring and individual feature analysis allow the system to determine if the candidate image represents the same object as the original one. Over time, adjustments can be made to account for changes in object appearance, the introduction of new features, or naturally occurring wear and tear. The system's architecture also supports filtering out certain feature failure modes and establishing scoring thresholds that automate certain verification tasks. Subsequent candidate images undergo a similar masking process, guided by the original cues and prompts or feature updates.

After the system has established a golden image and its associated golden mask, and after a candidate image has undergone its own segmentation to produce a candidate mask, the platform seeks to determine whether the candidate truly represents the same physical object as the origin object. To achieve this, in one embodiment, the processing component leverages the matcher component, which uses advanced computer vision techniques, feature detection algorithms, and homography transformations to align and compare images with exceptional precision.

The matching process begins once the processing component retrieves the golden image and golden mask, along with the candidate image and candidate mask, from the datastore. These elements are then submitted to the matcher for analysis. The matcher isolates each object's masked regions and identifies feature points, up to thousands per image, to anchor the comparison. By focusing on salient features, such as corners and distinctive patterns, the matcher can map corresponding points across the two images, even if they differ in perspective or lighting.

In one embodiment, the system utilizes homograph to provide a projective transformation that aligns one image to another by modeling the perspective difference. By detecting and matching feature points, the matcher computes a homography matrix to warp the golden image so that it aligns closely with the candidate image. Once aligned, both forward and reverse homography calculations can detect subtle differences: a forward pass can confirm whether certain objects or details present in the golden image remain in the candidate image; a reverse pass can reveal if new features have appeared in the candidate image that were absent before. This approach allows the system to determine not only whether two images represent the same object, but also whether the object has changed over time, shedding or gaining features.

If a candidate mask is not available or deemed unreliable, the system can generate an auto-transformed mask by applying the computed homography to the golden mask. This flexible fallback ensures that, even in challenging conditions, the matcher can proceed with a robust comparison. When the matching component completes its analysis, it returns a match image and a confidence factor to the processing component. The server then stores these results and compares the confidence factor to a predefined threshold. Exceeding the threshold signals a verified match. The candidate image and candidate mask are then designated as the new golden image and new golden mask, respectively. This cyclical updating process ensures that the system always maintains the most recent, highest-quality reference image of the collectible, reflecting its current state of authenticity and condition. Relevant metadata, such as candidate ID, candidate geolocation, and updated golden images, are recorded on a blockchain to preserve an immutable provenance trail.

In one embodiment, the matching component implements the ORB (Oriented FAST and Rotated BRIEF) algorithm to detect and describe features robustly across various lighting conditions and object orientations. In one embodiment, distance ratio tests filter out weak matches, ensuring that only the strongest feature correspondences guide the homography estimation. In one embodiment, the RANSAC algorithm, known for its resilience to outliers, computes a stable homography matrix by ignoring spurious matches. Once the candidate image is aligned to the golden image, masks can be directly compared for overlap and consistency. Confidence scores, both global and feature-specific, are derived from how well these sets of points and segments align, and are adjusted based on the number of inliers (consistent matches that support a single transformation).

In one embodiment, the system uses grayscale images to reduce the complexities introduced by lighting changes. In one embodiment, the system uses color channels independently. By examining individual red, green, and blue channels, the matcher could distinguish subtle chromatic differences that might reveal alterations.

In one embodiment, the matcher handles standard images quickly scales horizontally to serve multiple concurrent requests. In one embodiment, it integrates with other system components that handle image preprocessing, segmentation, and embedding generation. In one embodiment, GPU acceleration, parallel processing optimizations, and integration of deep learning-based feature matchers are utilized to improve both speed and accuracy.

In one embodiment, the system not only verifies an item's identity, but also documents any modifications, additions, or general wear that develop as the item evolves.

In one embodiment, the system presents pre-selected relevant questions about an item's condition and prompts owners for an update scan whenever a change might have occurred. By building condition-related inquiries, such as wear, damage, or newly added features, directly into the user flow, the system surfaces these questions in a timely manner. The update scans work by comparing new images against stored reference data and previously documented features. In one embodiment, rather than treating tracking as a one-time event, the system supports a long-term dialogue about each item's life cycle.

Two primary types of scans anchor the system's functionality in this regard. The first, an update scan, is performed by the current owner who simply wants to note routine or event-driven changes. In these scenarios, overall match scores between older reference images and new scans may deviate because of the noted change. If the change was a new feature, such as a new scratch on the object, then the candidate image or subsequent candidate image would have a lower score, while the candidate feature image or subsequent candidate feature image would maintain their high scores. If the change was relevant to a feature, such as a missing knob, then that feature would have a lower score, while other feature images would maintain their higher scores, indicating that the item still closely resembles its origin data.

The second type of scan occurs when an item changes hands. In change-of-ownership scans, match scores should be high, signaling that the object has not been adulterated since it left the seller's hands. This ensures the record of the item remains comprehensive through each ownership transfer.

In one embodiment, the global match score assesses the overall similarity between a new scan and its reference images; a lower score indicates that significant differences need investigation. Feature scores, on the other hand, highlight specific attributes—such as a scratch, a knob, or a label—and quantify how each has changed. If the global match score remains high but certain feature scores drop, the system can prompt the user to locate and describe the specific alterations. This provides a fine-grained process for documenting all changes, no matter how subtle.

In one embodiment, when truly new elements appear, perhaps a signature, a sticker, or additional wear, the system can automatically create a new feature entry and ask the owner for details. Capturing "origin stories" for each feature promotes a rich narrative of how the item has evolved.

In one embodiment, in order to distinguish genuine modifications from falsely recognized differences, the system employs a separate match process that excludes known feature regions. This helps confirm that a variation does not stem from an already documented characteristic. Additionally, to avoid categorizing normal shifts in the item's position or orientation as entirely new, the system maintains precise boundaries around each feature.

Each update scan adds new pieces of the story, identifying these incremental details such as scuffs, customizations, repairs shape an item's provenance, tying it to real-world events. Over time, owners and buyers can consult this evolving narrative. An item might become a "living artifact," continuously passed around and accruing distinctive features that enhance its value. In addition to providing timestamps for each update, the system can integrate external context to further enrich the item's historical record.

In one embodiment, when the matching engine eventually identifies a discrepancy, the system may ask owners for more information. In one embodiment, users could be prompted to highlight new features themselves. In one embodiment, the system may display a side-by-side comparison of the old and new images, pointing out possible discrepancies.

In one embodiment, the system has the ability to store reference images of an item from multiple angles. Instead of having just one photo that captures an item's "front," the system can prompt accept additional images that reveal the back, sides, or even interior details. Each angle or vantage point is tied into the overall match score, creating a complete representation of the item's geometry and ensuring that new features on a previously unscanned side are not overlooked.

In one embodiment, the system incorporates 3D scanning. In one embodiment, the system, most captures multiple 2D images. In one embodiment, to ensure that each angle is adequately covered, the platform incorporates feedback loops indicating that certain angles remain partially unscanned or indicating that extra photos are required if the item is particularly large or complex.

In one embodiment, the system is designed to shift from simple identity verification to a richer, story-driven record of how items evolve. It uses a powerful matching engine that flags any new or changed features and collects attendant descriptions of them. By assembling these data points into a timeline or visual history, the system provides a cohesive view of an item's provenance. Prospective buyers can see every small change throughout the item's lifetime, and owners can reflect on an evolving collection of stories tied to its material form.

In one embodiment, an update scan triggers the system to note that something has changed, accepts feedback on the specifics, and merges that feedback into an item's running narrative. Each feature is ultimately anchored to one or more images, and context can be added where needed.

In one embodiment of the present invention, the matching component is designed explicitly to support flexible, non-rigid objects, such as textiles, that present significant challenges to traditional matching techniques. In some instances, a matching component relies on planar homography transformations, assuming objects are rigid and planar. In some cases flexible objects can violate this assumption, resulting in inaccurate or unsuccessful matches.

In one embodiment of the present invention, the system integrates an advanced matcher which employs a hybrid approach blending traditional computer vision feature-matching methods with sophisticated machine learning models. In one embodiment, the system assesses individual feature matches independently, without enforcing a global planar homography, thereby enabling the accurate identification and verification of flexible objects. In one embodiment, the system accomplishes this by performing a multi-layer analysis using machine learning to produce confidence scores for each potential match, independent of rigid-body assumptions.

In one embodiment of the present invention, the matching component supports flexible object verification by directly computing and evaluating confidence scores for individual matched features. In one embodiment, advanced algorithms apply general machine learning models to independently assess each potential match point. This approach allows the system to robustly verify the authenticity of flexible objects without relying on planar homography constraints.

Confidence metrics are generated from the aggregated confidence scores of high-quality matched features. A minimum number of feature points (e.g., N=6) are utilized to ensure reliability, allowing the system to maintain high accuracy without requiring rigid-body alignment.

In one embodiment, to address computational complexity, various optimization techniques may be adopted, such as feature pre-extraction, caching, parallelized computations, and strategic resolution adjustments. These optimizations enable the system to handle computationally intensive algorithms efficiently.

In one embodiment, masks may be applied directly onto the images prior to matching, removing the background explicitly from the image rather than employing separate mask arrays. Additionally, pre-extraction of features upon initial image ingestion is supported, further reducing computational overhead during the matching process.

In one embodiment, the system introduces a matching framework that supports flexible object verification without depending on rigid-body constraints. The process begins by capturing both an origin and candidate image of the object, followed by segmentation and masking to isolate the object from its background. After this preprocessing, the system extracts distinctive feature points independently from both images, emphasizing features robust to deformation.

The matching component operates without enforcing rigid transformations. Instead, it relies on advanced algorithms, including general-purpose machine learning models, to evaluate the quality of each matched feature point. Confidence scores are computed for each match, and an aggregate confidence score is derived to reflect both the quality and quantity of successful feature matches. A minimum number of matched points is required to ensure statistical reliability.

The system further enhances verification accuracy by adapting to the physical characteristics of the object being matched. Objects are classified as either relatively static or flexible. For static items such as photographs or flat artworks, the final decision emphasizes the overall image match confidence. For flexible items like clothing or textiles, more weight is given to feature-level confidence, recognizing the higher likelihood of variations in global shape or orientation.

In another embodiment, the system supports matching processes that do not involve masking for the candidate image. In such cases, stored golden image and mask data are compared directly to unmasked candidate images. If the computed confidence factor exceeds a defined threshold, the system records metadata such as candidate identification and geolocation to a blockchain or distributed ledger. This ensures not only robust visual verification but also secure tracking of provenance.

The combination of flexible matching, confidence scoring, adaptive weighting, and blockchain integration enables this system to perform accurate and reliable object verification across a wide range of object types, including both rigid and flexible items.

In one embodiment, the system thus robustly accommodates both rigid and flexible object authentication within a unified provenance verification workflow, significantly enhancing applicability and precision across diverse collectible categories.

These and other features, aspects, and embodiments are described below in the section entitled "Detailed Description."

BRIEF DESCRIPTION OF THE DRAWINGS

A complete understanding of the present invention may be obtained by reference to the accompanying drawings, when considered in conjunction with the subsequent, detailed description, in which.

DETAILED DESCRIPTION

Figure 1:
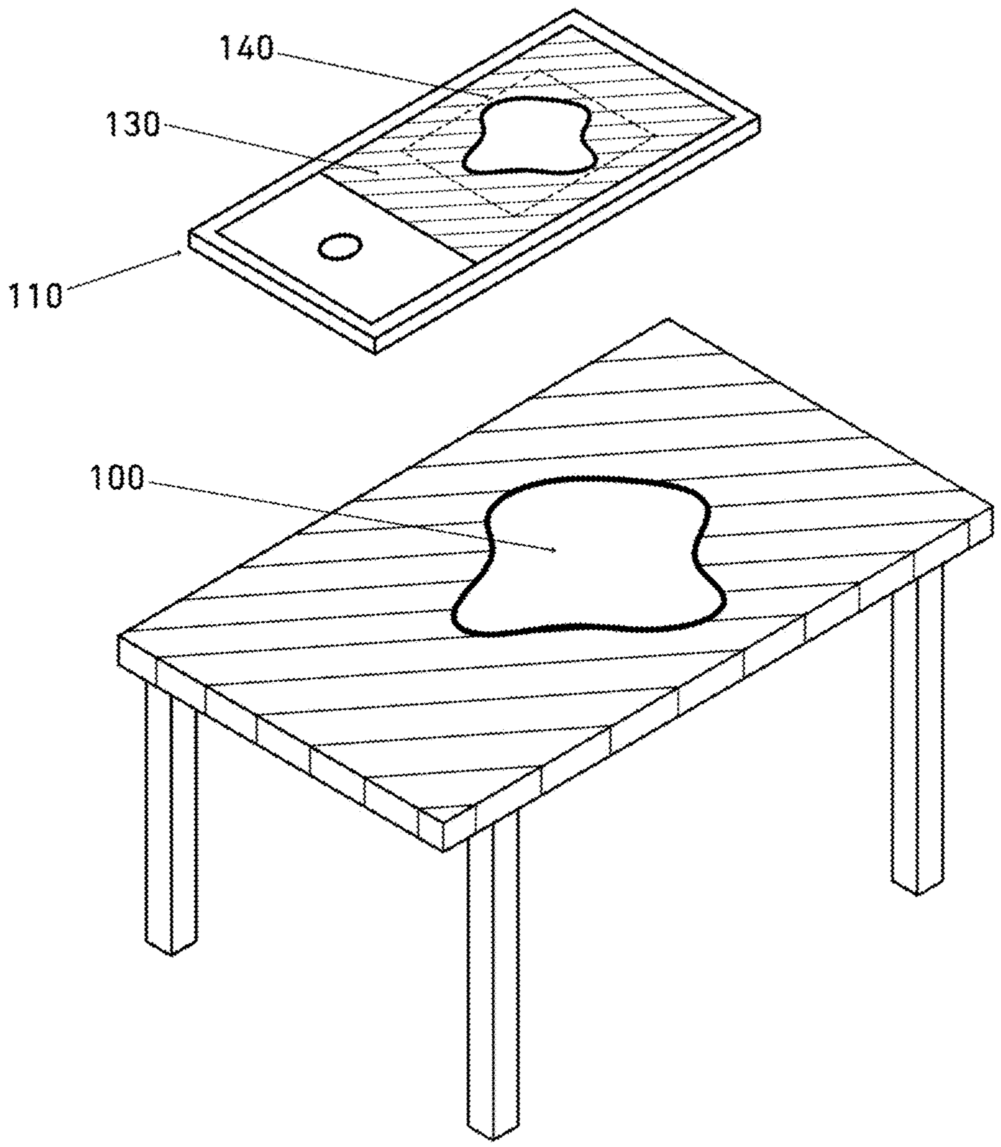
FIG. 1 is an illustration of a capture device capturing an origin image of an object.

Before the invention is described in further detail, it is to be understood that the invention is not limited to the particular embodiments described, as such may, of course, vary. It is also to be understood that the terminology used herein is for the purpose of describing particular embodiments only, and not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed with the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It must be noted that as used herein and in the appended claims, the singular forms “a”, “an”, and “the” include plural referents unless the context clearly dictates otherwise.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, if dates of publication are provided, they may be different from the actual publication dates and may need to be confirmed independently.

In one embodiment of the present invention, the immutable chain of physical object provenance is implemented by obtaining a capture of an origin image of an object. In one embodiment, originator ID information and origin geolocation are also captured. The origin image of an object can be a live photo capture of the object taken from a capture device such as a smartphone. In one embodiment, the live photo capture is obtained within an app distributed by the platform that is running on the capture device. In the case of a smartphone the app accesses the camera component of the smartphone operating system to ensure that the image of the object is obtained live from the camera, and will not allow an image to be uploaded from the photo gallery, or from a file. Additionally, in one embodiment, the app accesses the geolocation component of the smartphone to obtain the geolocation coordinates of the image being taken. Additionally, the app can access the clock component of the smartphone operating system to obtain the date timestamp of when the image was obtained. The app is also communicatively connected to the platform which authenticates the originator's account and ensures the identity of the originator on each interaction with the platform.

FIG. 1 shows a capture device 110 capturing an origin image 130 of an object 100. The origin image 130 is shown with a bounding box 140 overlayed on the display delimiting the object 100. The bounding box serves to focus attention on the object 100, and can subsequently be used with a segmentation component as a prompt to improve segmentation accuracy. In one embodiment of the present invention, a user is prompted to center the object 100 within the bounding box 140. In one embodiment, the capture device 110 automatically captures the origin image 130 when it is within the bounding box 140 and in focus with sufficient lighting. In one embodiment, the capture device 110 automatically takes a second origin image of the object 100 for use in case the origin image 130 is defective. In one embodiment, the second origin image is taken within one second of the origin image.

In one embodiment of the present invention, the process can be repeated for an object that has multiple dimensions or sides with distinguishing features necessary to identify it. In this case, the capture device 110 would acquire multiple origin images 130 of an object 100, ensuring that all distinguishing features necessary for identification are recorded. Each origin image 130 is displayed with a bounding box 140 overlayed on the display to delimit the object 100. The bounding box serves to focus attention on the object 100 and can subsequently be utilized as a segmentation prompt to enhance accuracy.

In one embodiment, the user is prompted to position each distinct side of the object 100 within the bounding box 140 before capturing an image. The capture device 110 may automatically take multiple origin images 130, capturing different perspectives of the object 100 when it is properly framed, in focus, and under sufficient lighting conditions. In one embodiment, a secondary origin image of each side is captured to serve as a backup in case of defects. These secondary images may be taken within a predefined time window, such as one second after the primary capture, to ensure continuity.

Figure 2:
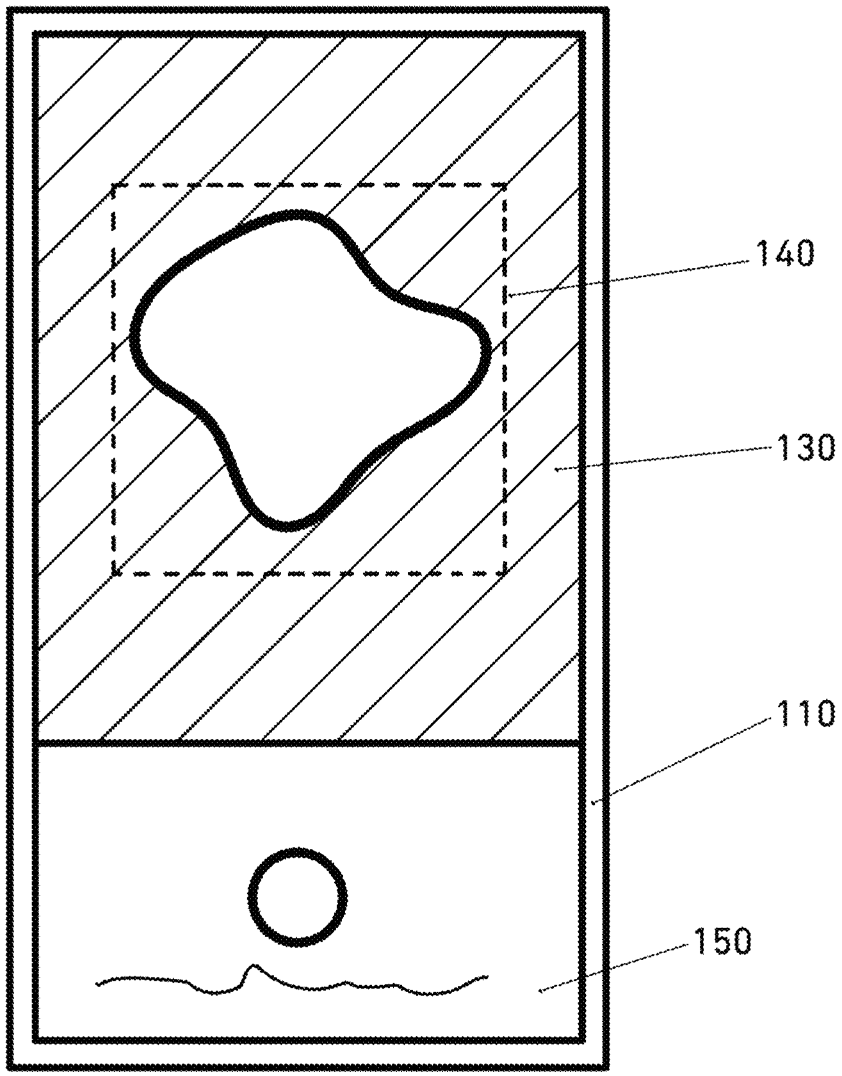
FIG. 2 is an illustration of a capture device capturing an origin image.

FIG. 2 is a front view of the capture device 110 displaying the origin image 130 with a bounding box 140 overlayed on the display. In one embodiment, after the origin image 130 has been captured, the capture device 110 captures an origin description 250. In one embodiment, the microphone of the capture device 110 is activated and the origin description 250 is captured as an audio file. In one embodiment, the origin description 250 as an audio file is transcribed and saved to a datastore. In one embodiment, the origin description 250 is transmitted to a large language model for transcription, summarization and editing. In one embodiment, the process is repeated for objects with multiple dimensions. FIG. 2 presents a front view of the capture device 110 displaying an origin image 130 with a bounding box 140 overlayed on the display. After capturing the required origin images 130 of all relevant sides, the capture device 110 also acquires an origin description 250. In one embodiment, the device's microphone is activated to record an audio-based origin description 250. This audio recording can be transcribed and stored in a datastore. Additionally, in one embodiment, the transcribed origin description 250 is sent to a large language model for further transcription, summarization, and editing to improve clarity and consistency.

Figure 3:
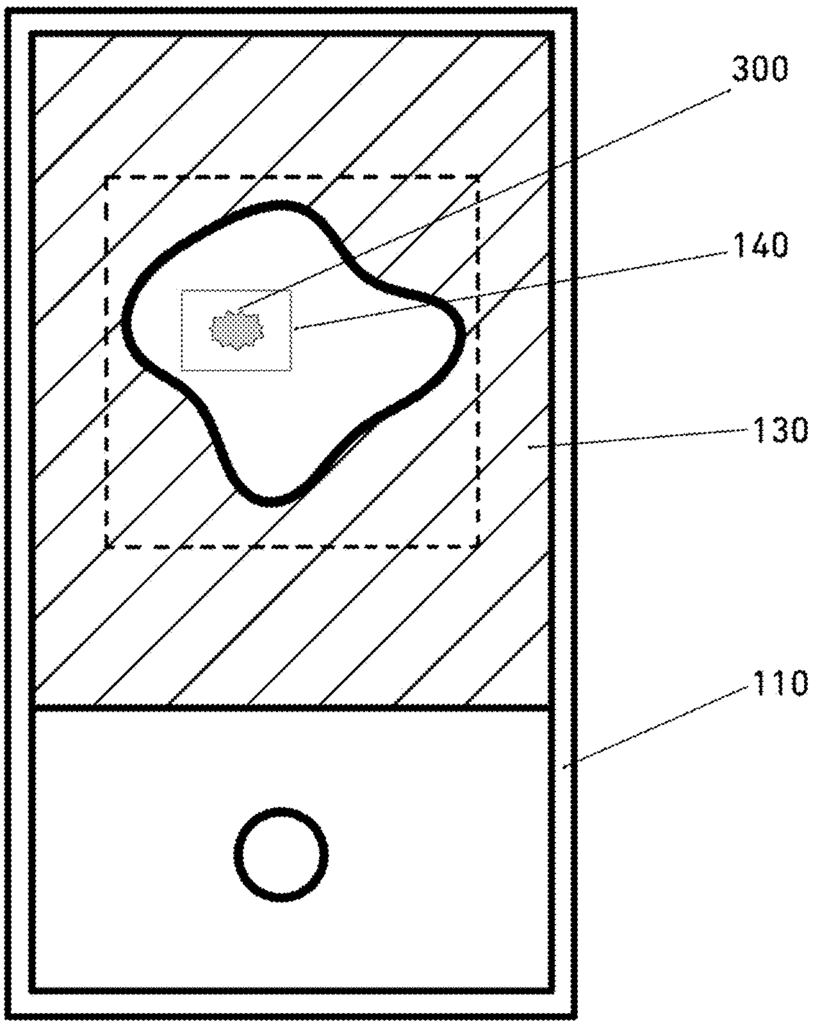
FIG. 3 is an illustration of a capture device capturing a feature image of a feature.

FIG. 3 is a front view of the capture device 110 displaying the origin image 130 with multiple bounding boxes 140 overlayed on the display delimiting multiple features 300. In one embodiment of the present invention, a feature 300 or multiple features 300 can be identified on the origin image 130 by tapping on the location or otherwise indicating the location of the feature 300 on the origin image.

Figure 4:
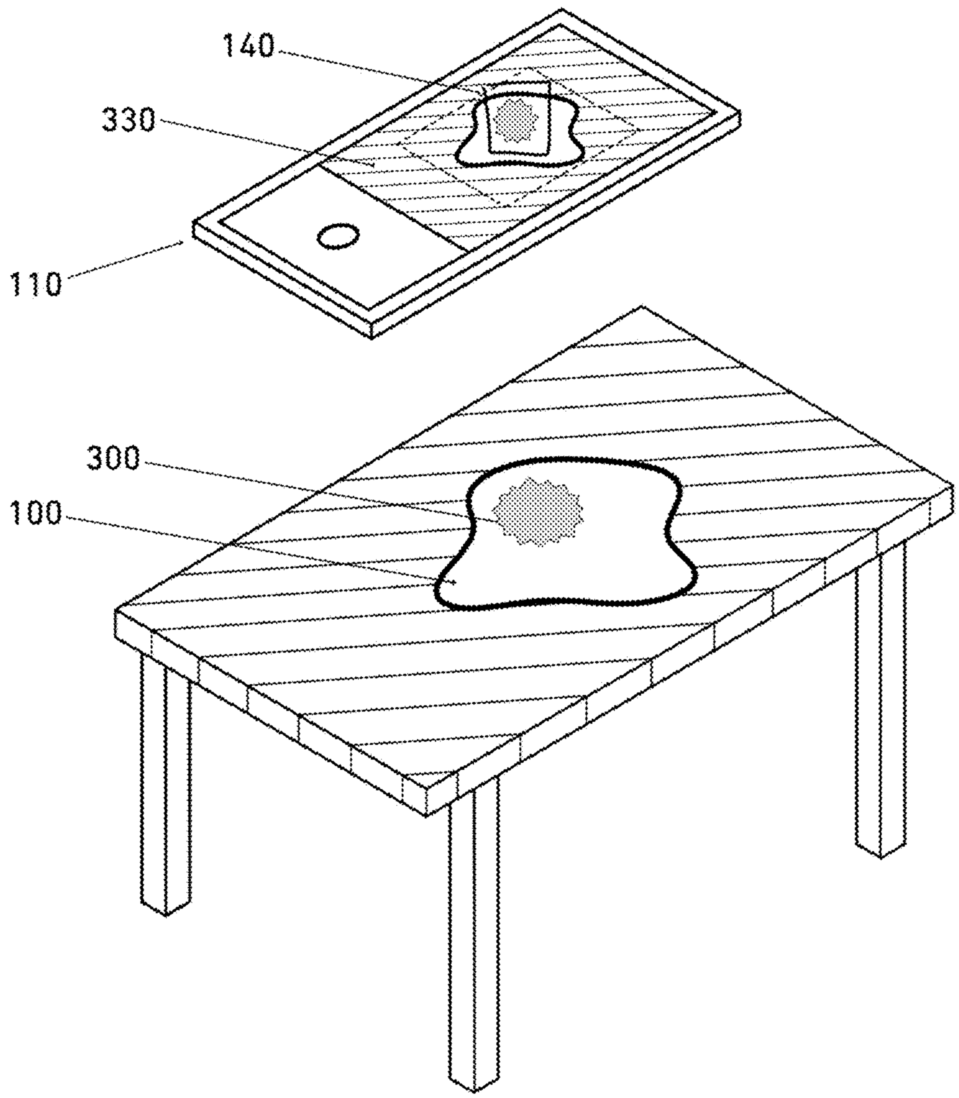
FIG. 4 is an illustration of a capture device capturing a feature.

FIG. 4 shows a capture device 110 capturing a feature image 330 of a feature 300. The feature image 330 is shown with a bounding box 140 overlayed on the display delimiting the feature 300. The bounding box serves to focus attention on the feature 300, and can subsequently be used with a segmentation component as a prompt to improve segmentation accuracy. In one embodiment of the present invention, a user is prompted to center the feature 300 within the bounding box 140. In one embodiment, the capture device 110 automatically captures the feature image 330 when it is within the bounding box 140 and in focus with sufficient lighting. In one embodiment, the capture device 110 automatically takes a second feature image 330 of the object 100 for use in case the first feature image 330 is defective.

Figure 5:
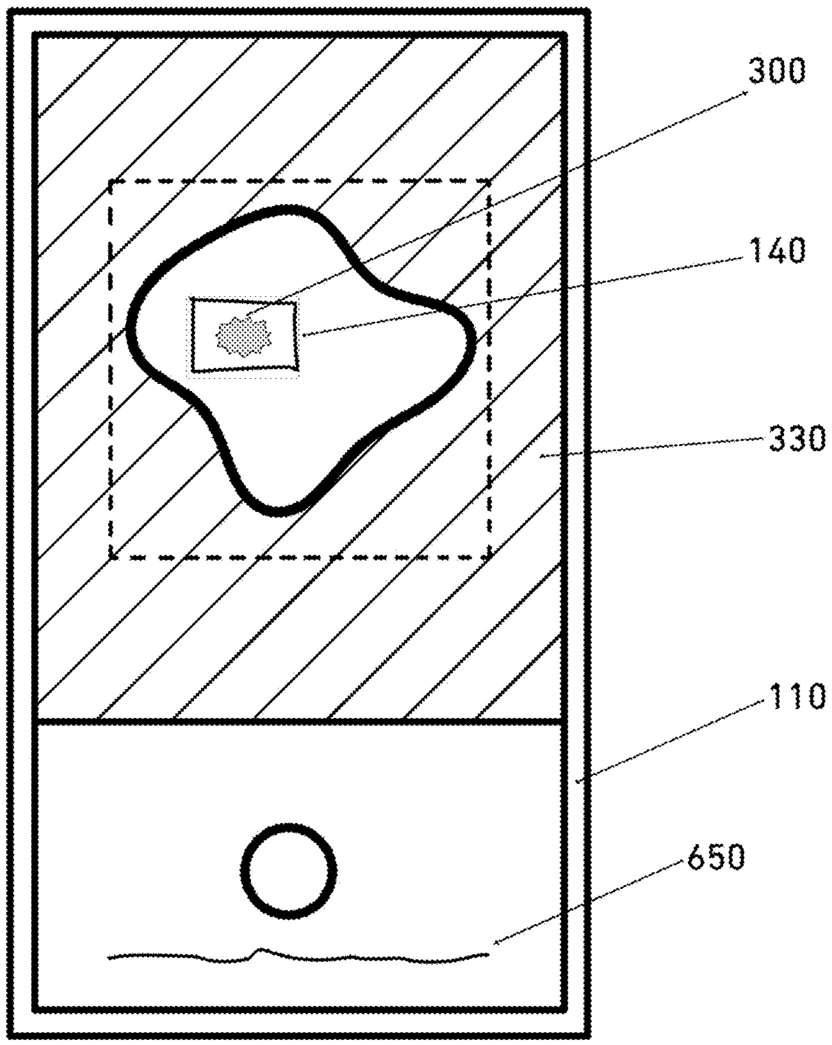
FIG. 5 is an illustration of a capture device capturing a multiple features.

FIG. 5 is a front view of the capture device 110 displaying the origin image 130 with a bounding box 140 overlayed on the display. In one embodiment the user taps on the feature 300 on the origin image 130, and the system then zooms in on that location to capture a feature image.

Figure 6:
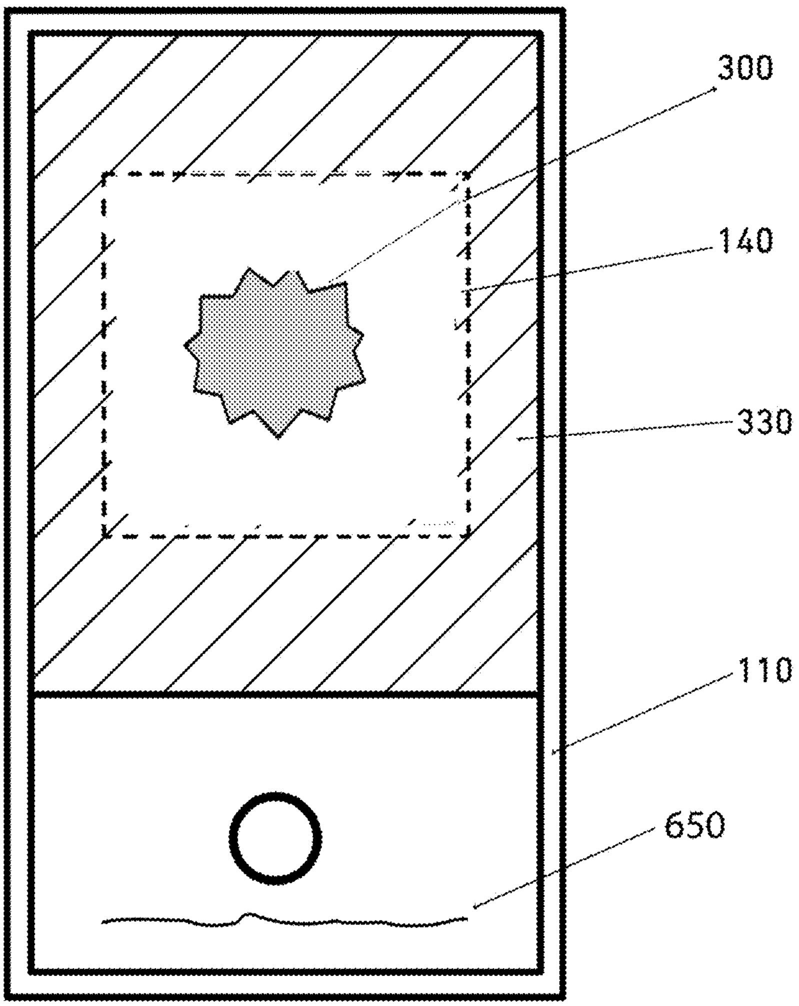
FIG. 6 is an illustration of a capture device capturing a feature, location and description.

FIG. 6 is a front view of the capture device 110 displaying the feature image 330 with a bounding box 140 overlayed on the display after the system has zoomed in on the feature. In one embodiment, after the feature image 330 has been captured, the capture device 110 captures a feature description 650. In one embodiment, the microphone of the capture device 110 is activated and the feature description 650 is captured as an audio file. In one embodiment, the feature description 650 as an audio file is transcribed and saved to a datastore. In one embodiment, the feature description 650 is transmitted to a large language model for transcription, summarization and editing.

Figure 7:
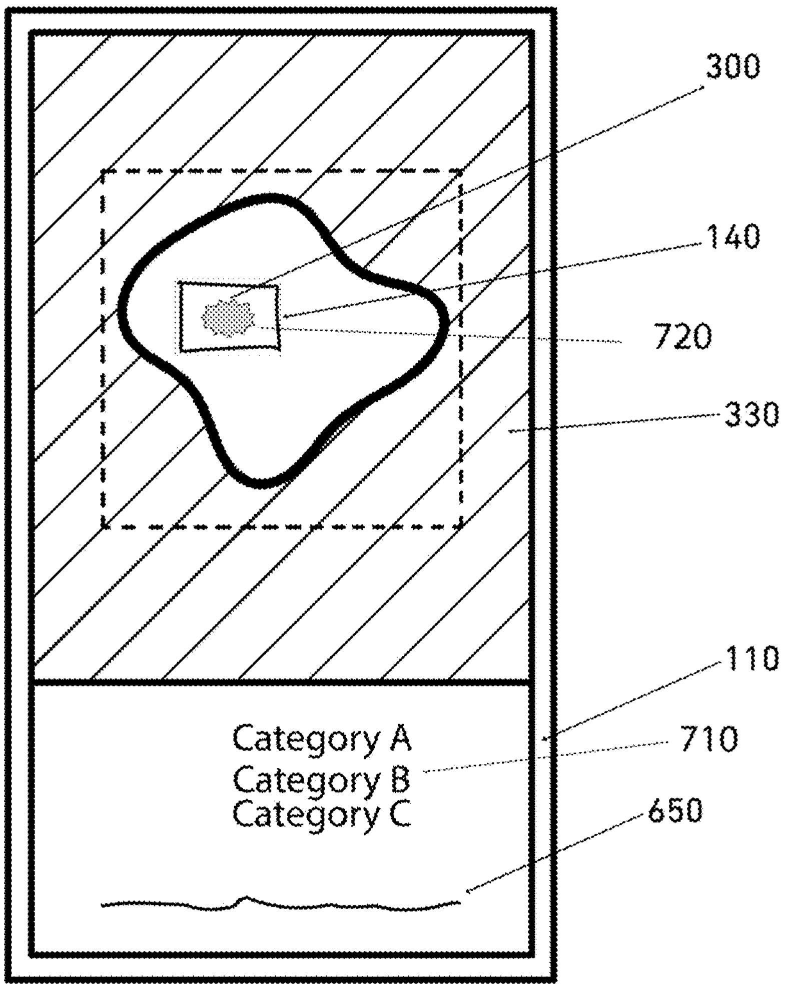
FIG. 7 is an illustration of a capture device capturing a feature, location and category.

FIG. 7 is a front view that shows the capture device 110 displaying the interface for identifying a feature 300 on the feature image 330 that also includes associating a feature category 710 with a feature 300. In one embodiment, the feature identification process includes associating a feature category 710 with a feature description 650 and a feature location 720, which may be included in a prompt to a segmentation component.

Figure 8:
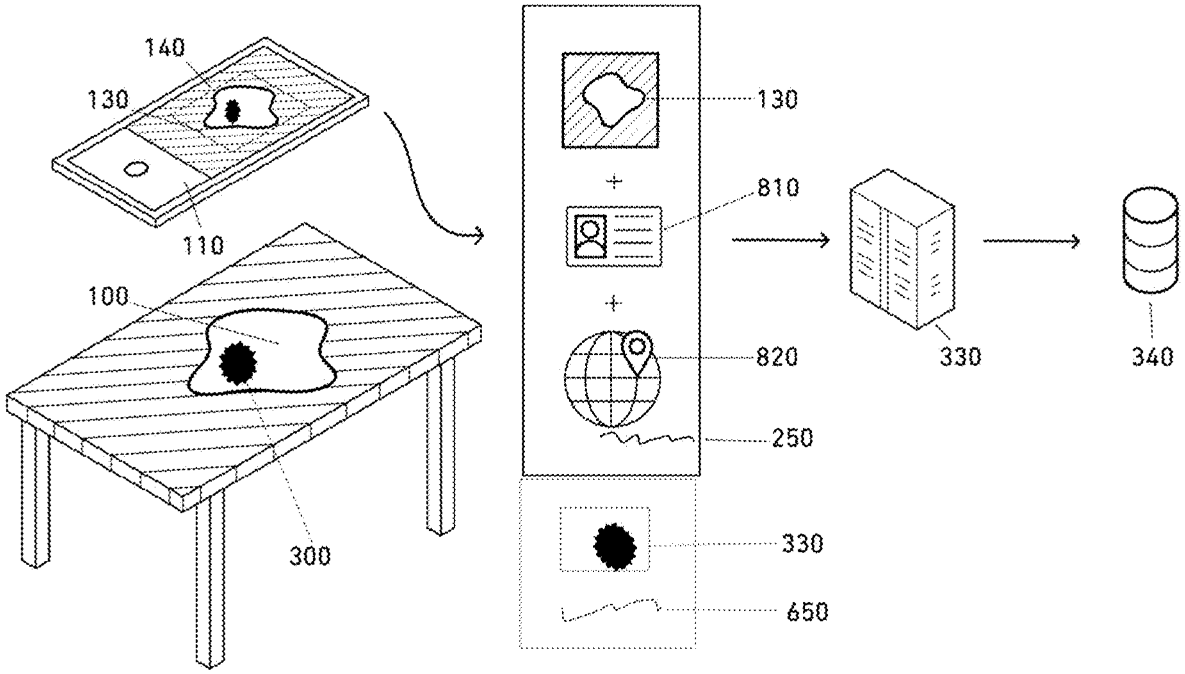
FIG. 8 is a flow diagram of the capture process.

FIG. 8 shows the origin capture process wherein the capture device 110 captures the origin image 130 of the object 100 and the feature image 330 of the feature 300. The origin image 130 is shown with a bounding box 140 overlayed on the display. The capture device 110 is communicatively connected to the platform and through the app sends the origin image 130. In one embodiment, the app also sends originator ID information 810 and origin geolocation 820 to the processing component 830, which then stores the origin image 130, originator ID information 810 and origin geolocation 820 into a datastore 840. In one embodiment, the origin image 130 and feature image 330 are stored in an object storage for performance and scalability, and the originator ID information 810 and origin geolocation 820 and a pointer to the object storage location of the origin image 130 and the feature image 330 are stored in a NoSQL or relational database. In one embodiment, the app captures the origin image 130 and feature image 330 when the originator presses the camera button. In one embodiment, the app determines when the optimal alignment is reached and automatically triggers the camera component of the capture device operating system to capture the origin image 130 and the feature image 330. In one embodiment, the origin image 130 and feature image are sent back to the processing component 830 is the portion of the image within their respective bounding box 140. In one embodiment, background outside of the bounding box 140 is displayed as blurred. In one embodiment, an origin description and a feature description are sent back to the processing component 830.

Figure 9:
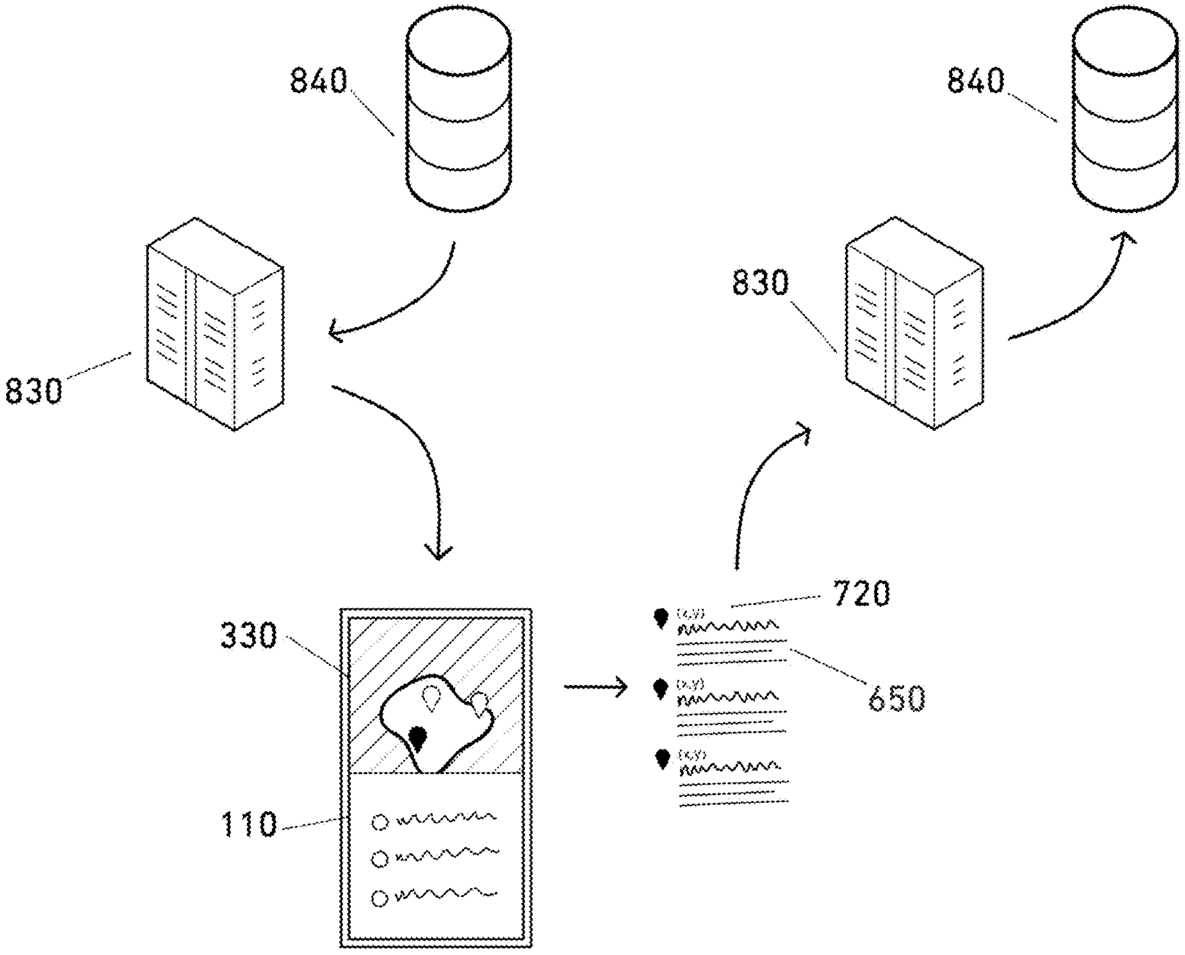
FIG. 9 is a flow diagram of the feature capture process.

FIG. 9 shows the process of feature identification. Feature descriptions 650 and feature locations 720 can be effective data points to provide in a prompt to a segmentation component. In one embodiment, the process entails capturing the origin image 130 and feature image 330, and submitting them to a segmentation component with at least one prompt. In one embodiment, the at least one prompt includes at least one feature description 650 and feature location 720. Additionally, the app is configured to allow the originator to add a feature description 650 associated with each feature location 720. The app is communicatively connected to the processing component 830, and transmits each feature location 720 and each feature description 650 to the processing component 830 which then stores each feature location 720 and each feature description 650 in the datastore 840.

Figure 10:
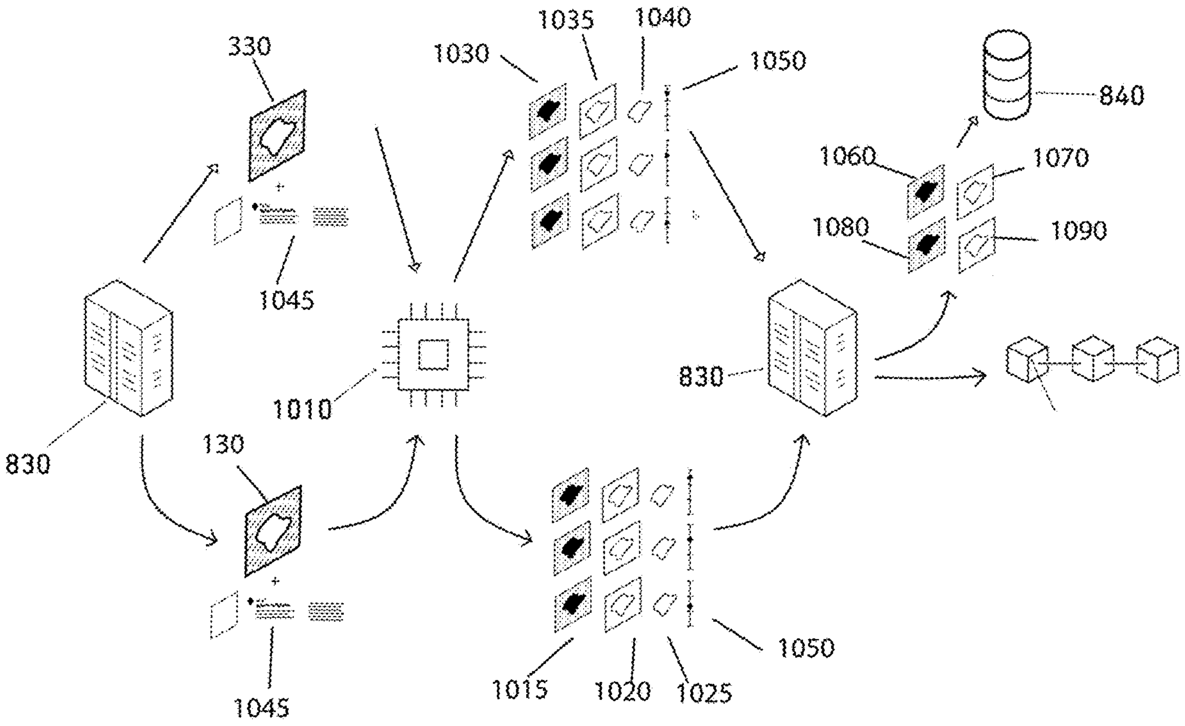
FIG. 10 is a flow diagram showing the origin masking process.

FIG. 10 shows the origin masking process. In one embodiment, this process is triggered when the origin image 130 is received by the processing component 830. In one embodiment, the origin masking process is run asynchronously. The origin masking process generates a segment image 1015, a segment mask 1020 for the origin image 130. In one embodiment, the origin masking process also generates a segment cutout 1025 for the origin image 130. The origin masking process also generates a feature segment image 1030 and a feature segment mask 1035 for the feature image 330. In one embodiment, the origin masking process also generates a feature segment cutout 1040 for the feature image 330.

Continuing with FIG. 10, in one embodiment, the segmentation component 1010 also returns a confidence factor 1050 for each segment mask 1020. In one embodiment, multiple segment images 1015, segment masks 1020, and segment cutouts 1025 are generated for the origin image 130, and the processing component 830 selects the segment mask 1020 that has the highest confidence factor 1050 returned by the segmentation component 1010. In one embodiment, multiple feature segment images 1030, feature segment masks 1035, and feature segment cutouts 1040 are generated for the feature image 330, and the processing component 830 selects the feature segment mask 1035 that has the highest confidence factor 1050 returned by the segmentation component 1010.

Continuing with FIG. 10, the origin masking process starts with the processing component 830 sending the origin image 130 and at least one prompt 1045 and the feature image 330 and at least one prompt 1045 to a segmentation component 1010 for processing. The segmentation component 1010 returns a segment image 1015, a segment mask 1020 and a segment cutout 1025, for each of the origin image 130. The segmentation component 1010 returns a feature segment image 1030, a feature segment mask 1035 and a feature segment cutout 1040, for each feature image 330.

Continuing with FIG. 10, in one embodiment as shown, multiple segment images 1015, segment masks 1020, segment cutouts 1025, feature segment images 1030, feature segment masks 1035, and feature segment cutouts 1040 are generated using different algorithms, which are sent back to the processing component 830.

Continuing with FIG. 10, if one segment image 1015, segment mask 1020 and segment cutout 1025 are returned for the origin image 130, then the origin image 130 is designated as the golden image 1060 and the segment mask 1020 is designated as the golden mask 1070 and stored in the datastore 840. If one feature segment image 1030, feature segment mask 1035 and feature segment cutout 1040 are returned for the feature image 330, then the feature image 330 is designated as the feature golden image 1080 and the feature segment mask 1035 is designated as the feature golden mask 1090 and stored in the datastore 840.

Continuing with FIG. 10, if multiple segment images 1015, segment masks 1020, and segment cutouts 1025 are returned for the origin image 130, the processing component 830 selects the segment image 1015, segment mask 1020 and segment cutout 1025 for the origin image 130 that has the highest confidence factor 1050 returned by the segmentation component 1010. The processing component 830 then designates the selected segment mask 1020 for the origin image 130 as a golden mask 1070 and designates the origin image 130 as a golden image 1060 and stores them in the datastore 840. If multiple feature segment images 1030, feature segment masks 1035, and feature segment cutouts 1040 are returned for the feature image 330, the processing component 830 selects the feature segment image 1030, feature segment mask 1035 and feature segment cutout 1040 for the feature image 130 that has the highest confidence factor 1050 returned by the segmentation component 1010. The processing component 830 then designates the selected feature segment mask 1035 for the feature image 330 as a feature golden mask 1090 and designates the feature image 330 as a golden image 1080 and stores them in the datastore 840.

Continuing with FIG. 10, in one embodiment, the processing component 830 then stores the originator ID information, the origin geolocation, the golden image 1060, the golden mask 1070, the golden feature image 1080, the golden feature mask 1090 and each prompt 1045 in the datastore 840. In one embodiment, the processing component 830 then stores the originator ID information, the origin geolocation, the golden image 1060, the golden mask 1070, the golden feature image 1080, the golden feature mask 1090 and each prompt 1045 on a blockchain 1095.

Continuing with FIG. 10, in one embodiment, the segmentation component 1010 utilizes a process in computer vision where the origin image 130 and feature image 330 are divided into multiple segments (or sets of pixels), with each segment representing a distinct object or part of the image. The goal is to simplify or change the representation of an image into something more meaningful and extract the collectible from the background. In one embodiment, semantic segmentation is utilized wherein pixels are categorized into predefined classes. In one embodiment, instance segmentation is utilized wherein individual object instances are distinguished.

Continuing with FIG. 10, models utilized by the segmentation component 1010, especially those based on the transformer architecture or fine-tuned versions of popular vision models, can leverage prompts or additional information to better guide their outputs. By passing relevant prompts, the segmentation component 1010 can get a clearer idea of what the object 100 is, leading to more accurate or contextually appropriate segmentations. If the segmentation component 1010 is aware of the specific domain or context of the image, it can adjust its segmentation strategy accordingly. Additionally, for models that might overfit to certain patterns or lack exposure to varied data, prompts can help the segmentation component 1010 generalize better by providing hints or directions. In one embodiment of the present invention, the at least one prompt 1045 comprises the bounding box. In one embodiment, the at least one prompt 1045 comprises the origin image 130, a description of features on the origin image, locations of the features on the origin image.

Figure 11:
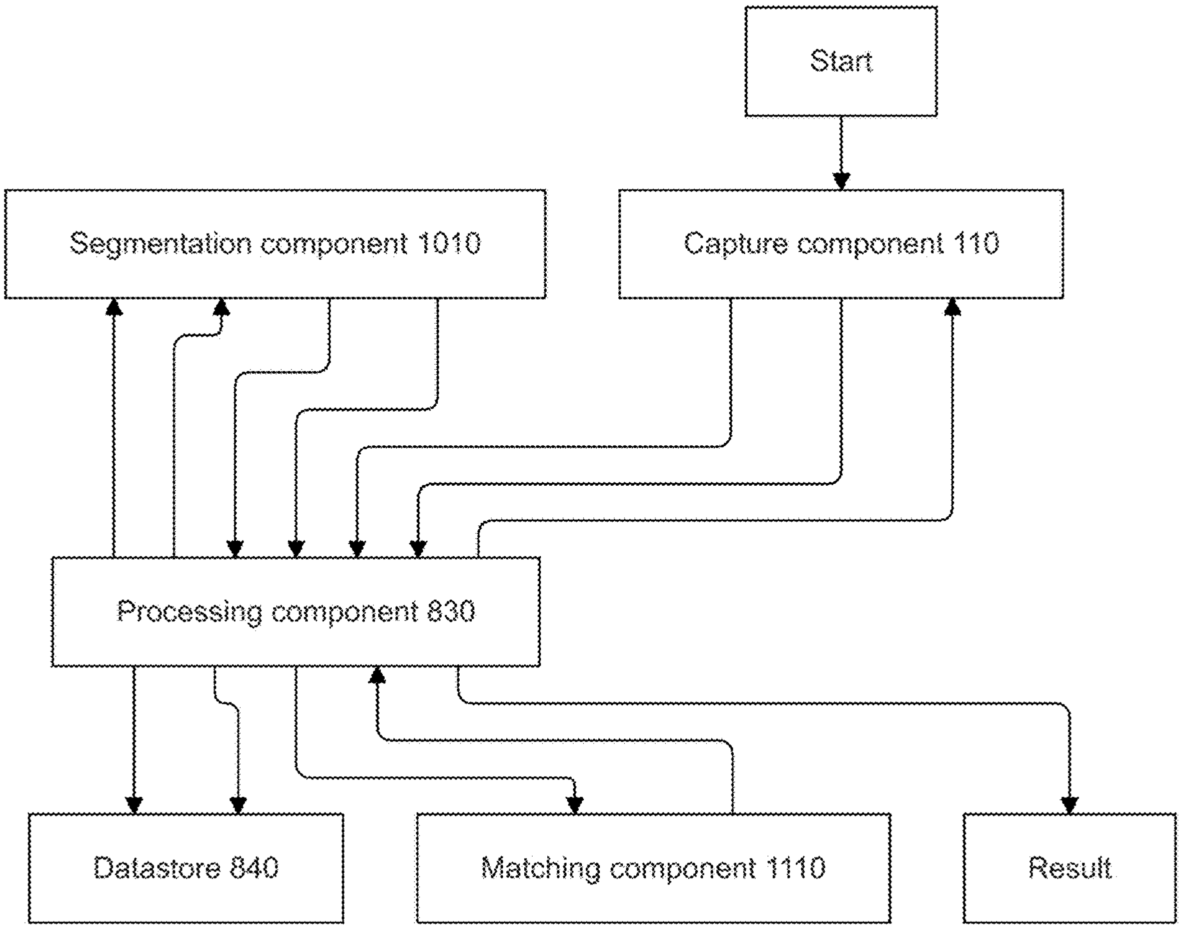
FIG. 11 is a flow diagram showing the feature masking process.

FIG. 11 shows a high-level diagram of the platform. The process starts with the capture component 110 which is initially responsible for capturing an origin image and feature image and submitting them to the processing component 830. The processing component 830 submits the origin image and feature image to the segmentation component 1010 to generate masks. The processing component 830 determines the best masks and saves them in the datastore 840. The process is repeated with the capture component 830 receiving a candidate image and a candidate feature image and submitting them to the processing component 830. The processing component 830 submits the candidate image and candidate feature image to the segmentation component 1010 to generate masks. The processing component 830 determines the best masks and saves them in the datastore 840. The processing component 830 then submits the origin image and mask along with the candidate image and mask to the matching component 1110, which returns a confidence factor for the match. In one embodiment, the processing component 830 also submits the feature image and mask along with the candidate feature image and mask to the matching component 1110, which returns a confidence factor for the match. The processing component then evaluates the returned confidence factors and determines whether there is a match.

Figure 12:
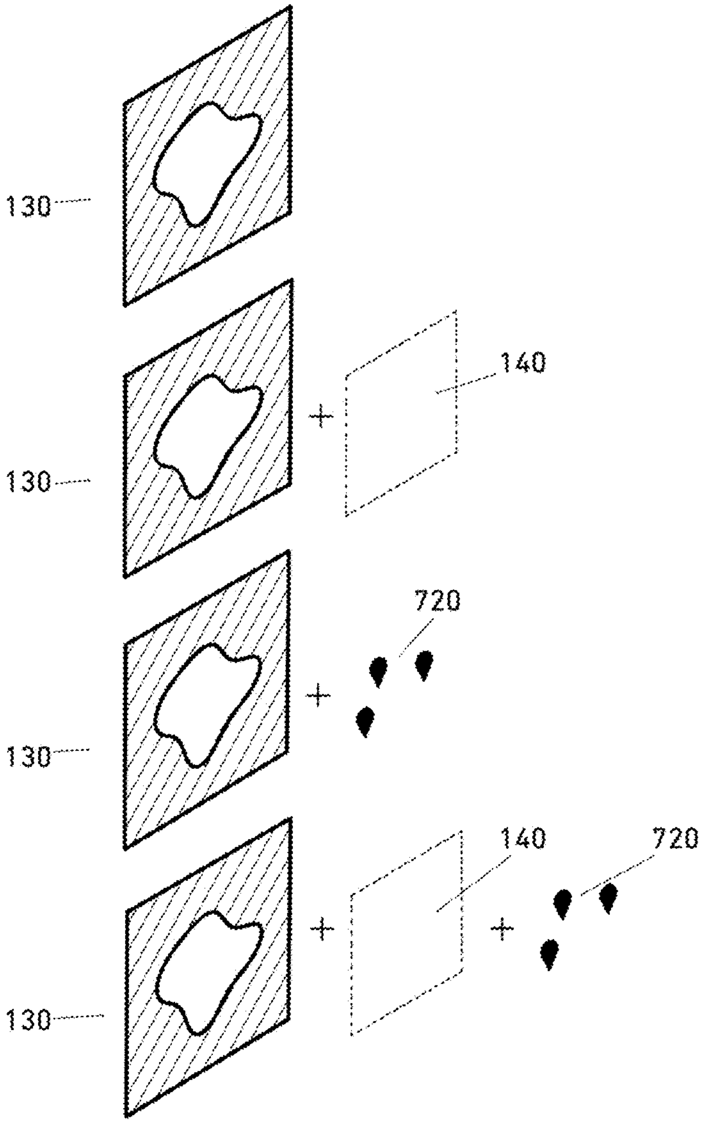
FIG. 12 is a diagram showing the feature masking process.

FIG. 12 shows some of the algorithms that can be run by the segmentation component, described from top to bottom as zero shot algorithm which includes as a prompt the origin image 130; box algorithm which includes as a prompt the origin image 130 and bounding box 140; points algorithm which includes as a prompt the origin image 130 and feature locations 720; and points box algorithm which includes as a prompt the origin image 130, feature locations 720, bounding box 140. The zero-shot algorithm is designed to segment objects in an image without any prior input, utilizing pre-trained features to predict segmentations autonomously. The bounding box algorithm takes a rectangular input as a guide, segmenting the object within the box by refining the area to align with object boundaries. The points algorithm uses positive or negative point annotations to identify the target object, interpreting points to highlight or exclude specific regions. Lastly, the points box algorithm combines both bounding boxes and points for segmentation, allowing for precise object delineation by narrowing the area of interest with a box and refining with points.

Figure 13:
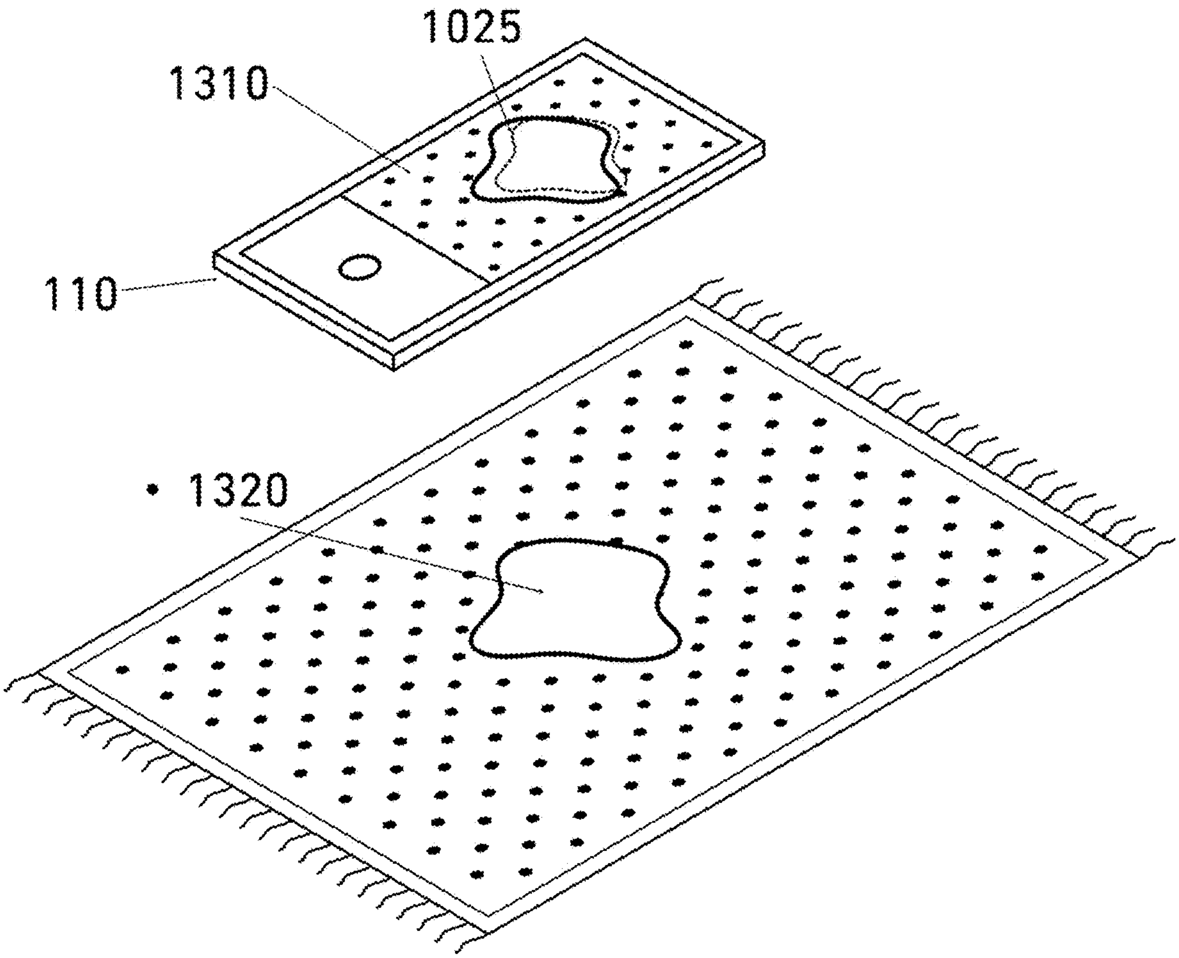
FIG. 13 is an illustration of capture device capturing a candidate image of a candidate object.

FIG. 13 shows the beginning of the candidate capture process. The candidate capture process is utilized to capture an image of an object so that it can be matched to the object to verify whether they represent the same physical object. FIG. 13 shows a capture component 110 capturing a candidate image 1310 of a candidate object 1320. The candidate image 1310 is shown with a cutout 1025 overlayed on the display to assist in the alignment of the camera to the candidate object 1320.

Figure 14:
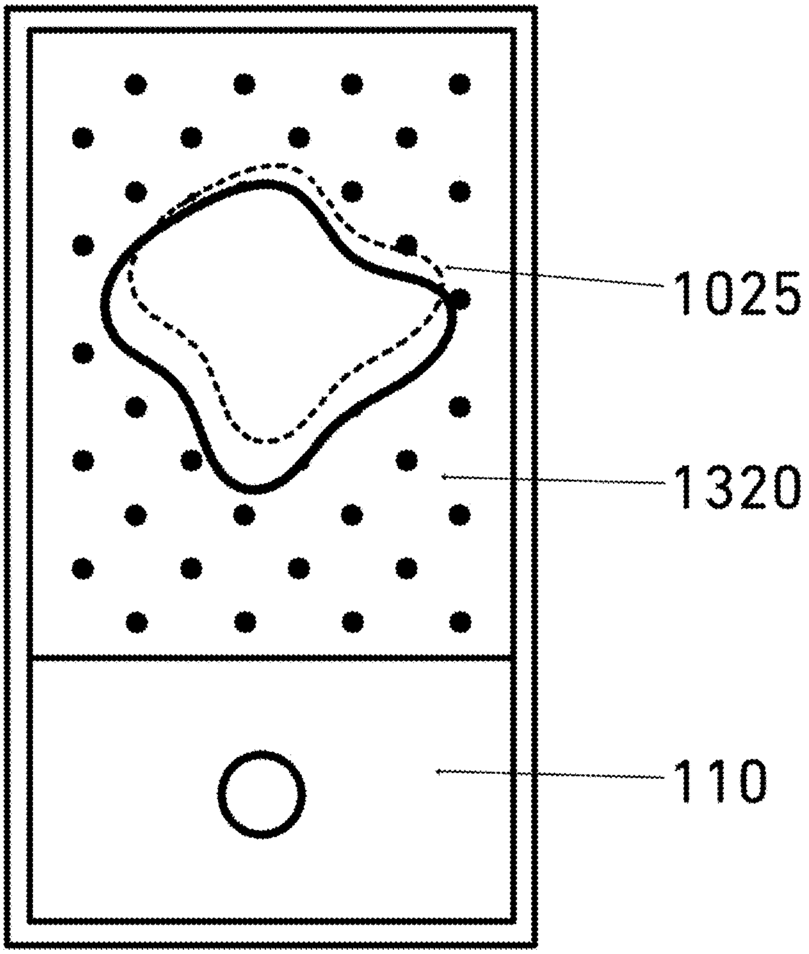
FIG. 14 is an illustration of a capture device capturing a candidate image.

FIG. 14 is a front view of the capture device 110 displaying the candidate image 1310 with the golden cutout 1025 overlayed on the display.

Figure 15:
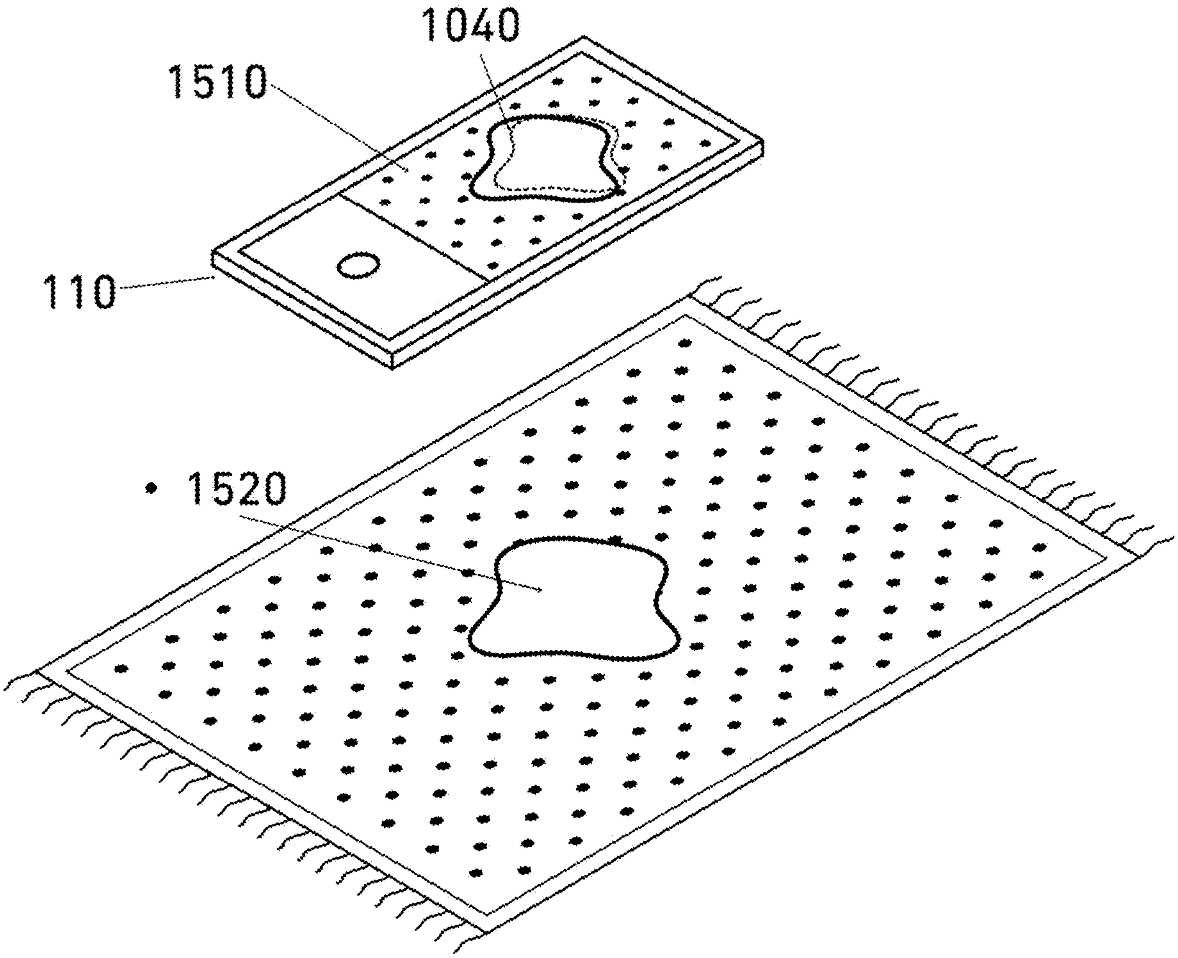
FIG. 15 is an illustration of a capture device capturing a candidate feature image of a candidate feature.

FIG. 15 shows the beginning of the candidate feature capture process. The candidate feature capture process is utilized to capture an image of a candidate feature so that it can be matched to the feature to verify whether they represent the same physical feature of the object. FIG. 15 shows a capture device 110 capturing a candidate feature image 1510 of a candidate feature 1520. The candidate feature image 1510 is shown with a feature segment cutout 1040 overlayed on the display to assist in the alignment of the camera to the candidate feature 1520.

Figure 16:
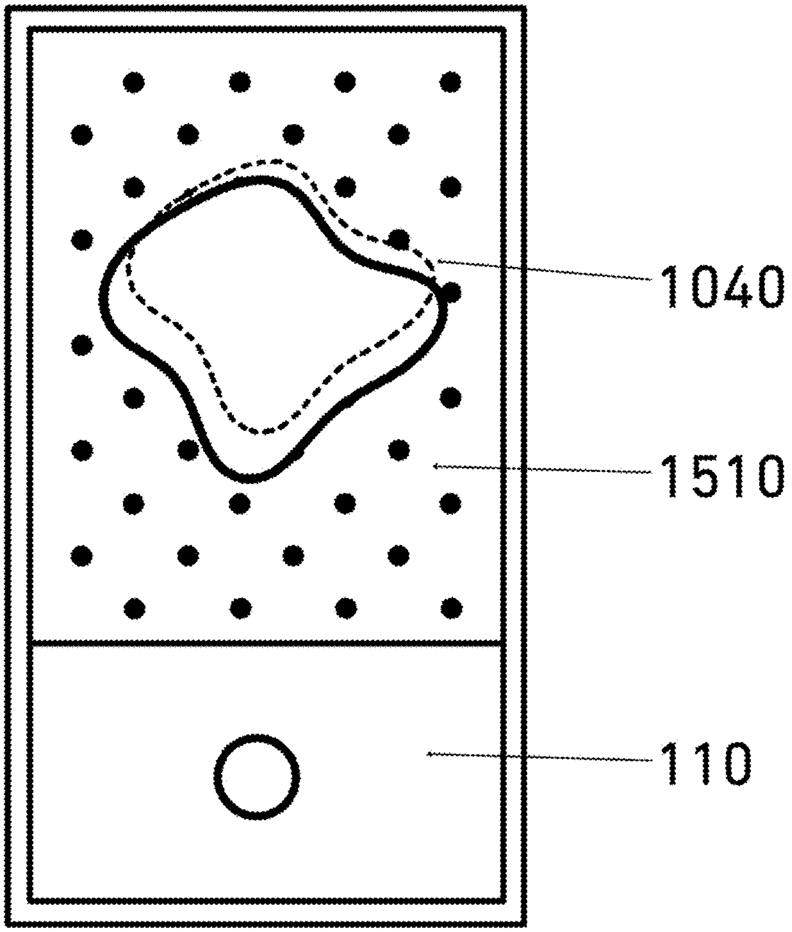
FIG. 16 is an illustration of a capture device capturing a candidate feature image.

FIG. 16 is a front view of the capture device 110 displaying the candidate feature image 1510 with the feature cutout 1040 overlayed on the display.

Figure 17:
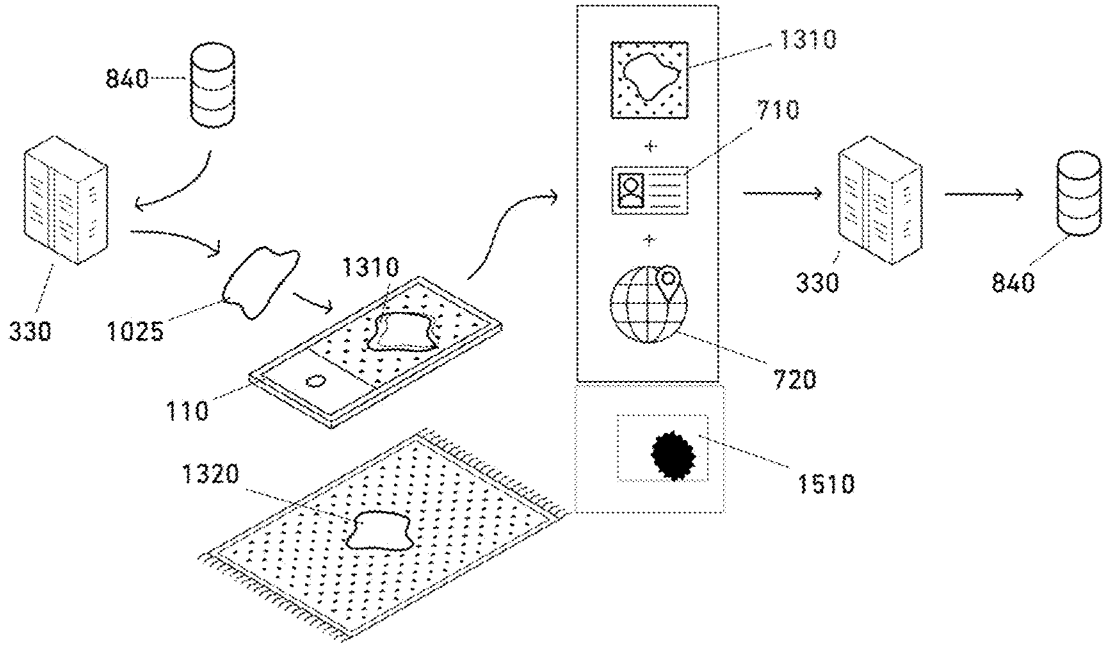
FIG. 17 is a flow diagram showing the candidate capture process.

FIG. 17 shows the candidate capture process wherein the capture component 110 captures a candidate image 1310 of a candidate object 1320. The candidate image 1320 is shown with a segment cutout 1025 overlayed on the display. The capture component 110 is communicatively connected to the platform and through the app sends the candidate image 1310, candidate ID information 1710 and candidate geolocation 1720 to the processing component 330, which then stores the candidate image 1310, candidate ID information 1710 and candidate geolocation 1720 into a datastore 840. In one embodiment, the candidate image 1310 is stored in an object storage for performance and scalability, and the candidate ID information 1710 and candidate geolocation 1720 and a pointer to the object storage location of the candidate image 1310 are stored in a NoSQL or relational database. In one embodiment, the app captures the candidate image 1310 when the candidate presses the camera button. In one embodiment, the app determines when the optimal alignment is reached and automatically triggers the camera component of the capture component 110 operating system to capture the candidate image 1310. In one embodiment, this process is replicated for the feature image.

Figure 18:
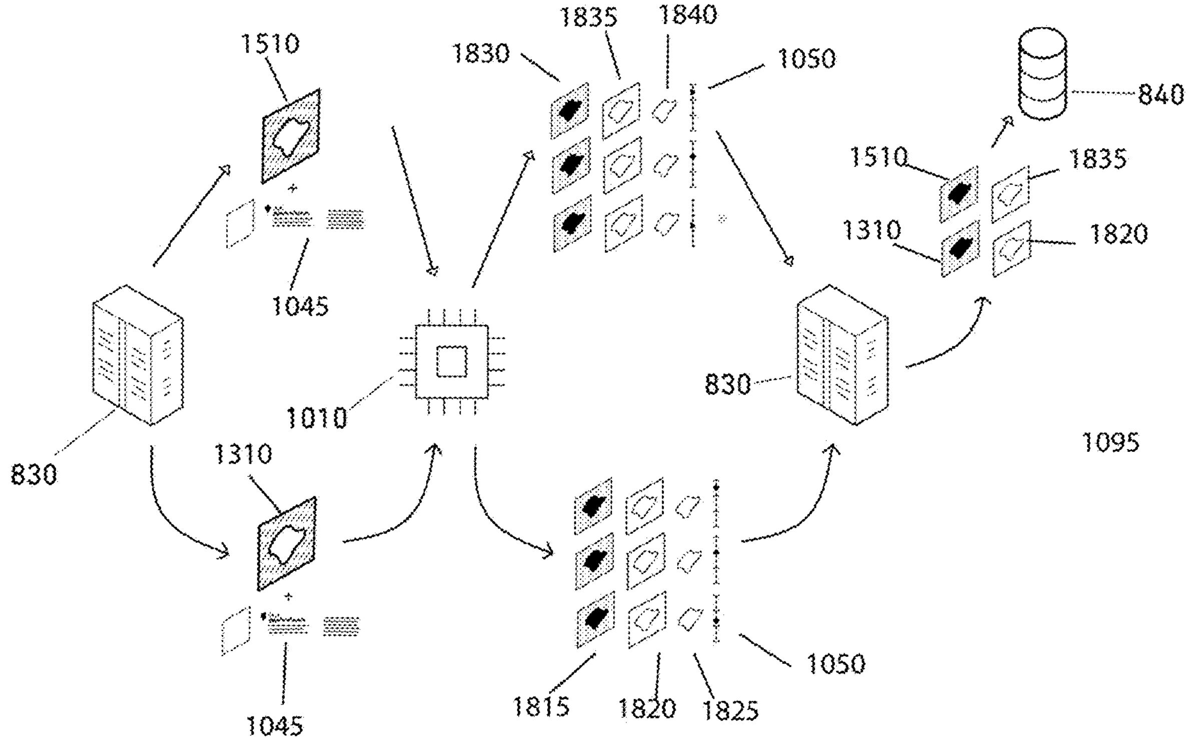
FIG. 18 is a flow diagram showing the candidate masking process.

FIG. 18 shows the candidate masking process. In one embodiment, this process is triggered when the candidate image 1310 is received by the processing component 830. In one embodiment, the origin masking process is run asynchronously. The candidate masking process generates a candidate segment image 1815 and a candidate segment mask 1820 for the candidate image 1310. In one embodiment, the candidate masking process also generates a candidate segment cutout 1825 for the candidate image 1310. The candidate masking process also generates a candidate feature segment image 1830 and a candidate feature segment mask 1835 for the candidate feature image 1510. In one embodiment, the candidate masking process also generates a candidate feature segment cutout 1840 for the candidate feature image 1510.

Continuing with FIG. 18, in one embodiment, the segmentation component 1010 also returns a confidence factor 1050 for each candidate segment mask 1820. In one embodiment, multiple candidate segment images 1815, candidate segment masks 1820, and candidate segment cutouts 1025 are generated for the candidate image 1310, and the processing component 830 selects the candidate segment mask 1820 that has the highest confidence factor 1050 returned by the segmentation component 1010. In one embodiment, multiple candidate feature segment images 1830, candidate feature segment masks 1835, and candidate feature segment cutouts 1840 are generated for the candidate feature image 1510, and the processing component 830 selects the candidate feature segment mask 1835 that has the highest confidence factor 1050 returned by the segmentation component 1010.

Continuing with FIG. 18, the candidate masking process starts with the processing component 830 sending the candidate image 1310 and at least one prompt 1045 and the candidate feature image 1510 and at least one prompt 1045 to a segmentation component 1010 for processing. The segmentation component 1010 returns a candidate segment image 1815, a candidate segment mask 1820 and a candidate segment cutout 1825, for the candidate image 1310. The segmentation component 1010 returns a candidate feature segment image 1830, a candidate feature segment mask 1835 and a candidate feature segment cutout 1840, for the candidate feature image 1510.

Continuing with FIG. 18, in one embodiment as shown, multiple candidate segment images 1815, candidate segment masks 1820, candidate segment cutouts 1825, candidate feature segment images 1830, candidate feature segment masks 1835, and candidate feature segment cutouts 1840 are generated using different algorithms, which are sent back to the processing component 830.

Continuing with FIG. 18, if one candidate segment image 1815, candidate segment mask 1820 and candidate segment cutout 1825 are returned for the candidate image 1310, then the candidate image 1310 and the candidate segment mask 1820 is stored in the datastore 840. If one candidate feature segment image 1830, candidate feature segment mask 1835 and candidate feature segment cutout 1840 are returned for the candidate feature image 1510, then the candidate feature image 1510 and the candidate feature segment mask 1835 are stored in the datastore 840.

Continuing with FIG. 18, if multiple candidate segment images 1815, candidate segment masks 1820, and candidate segment cutouts 1825 are returned for the candidate image 1310, the processing component 830 selects the candidate segment image 1815, candidate segment mask 1820 and candidate segment cutout 1825 for the candidate image 1310 that has the highest confidence factor 1050 returned by the segmentation component 1010. The processing component 830 then stores them in the datastore 840.

Continuing with FIG. 18, if multiple candidate feature segment images 1830, candidate feature segment masks 1835, and feature segment cutouts 1840 are returned for the candidate feature image 1510, the processing component 830 selects the candidate feature segment image 1830, candidate feature segment mask 1835 and candidate feature segment cutout 1840 for the candidate feature image 1510 that has the highest confidence factor 1050 returned by the segmentation component 1010. The processing component 830 stores them in the datastore 840.

Continuing with FIG. 18, in one embodiment, the processing component 830 then stores the candidate ID information, the candidate geolocation, the candidate image 1310, the candidate mask 1820, the candidate feature image 1510, the candidate feature mask 1835 and each prompt 1045 in the datastore 840.

Continuing with FIG. 18, in one embodiment, the segmentation component 1010 utilizes a process in computer vision where the candidate image 1310 and candidate feature image 1510 are divided into multiple segments (or sets of pixels), with each segment representing a distinct object or part of the image. The goal is to simplify or change the representation of an image into something more meaningful and extract the collectible from the background. In one embodiment, semantic segmentation is utilized wherein pixels are categorized into predefined classes. In one embodiment, instance segmentation is utilized wherein individual object instances are distinguished.

Continuing with FIG. 18, models utilized by the segmentation component 1010, especially those based on the transformer architecture or fine-tuned versions of popular vision models, can leverage prompts or additional information to better guide their outputs. By passing relevant prompts, the segmentation component 1010 can get a clearer idea of what the candidate object 1320 is, leading to more accurate or contextually appropriate segmentations. If the segmentation component 1010 is aware of the specific domain or context of the image, it can adjust its segmentation strategy accordingly. Additionally, for models that might overfit to certain patterns or lack exposure to varied data, prompts can help the segmentation component 1010 generalize better by providing hints or directions. In one embodiment of the present invention, the at least one prompt 1045 comprises the bounding box. In one embodiment, the at least one prompt 1045 comprises the candidate image 1310, a description of features on the candidate image, locations of the features on the candidate image.

Figure 19:
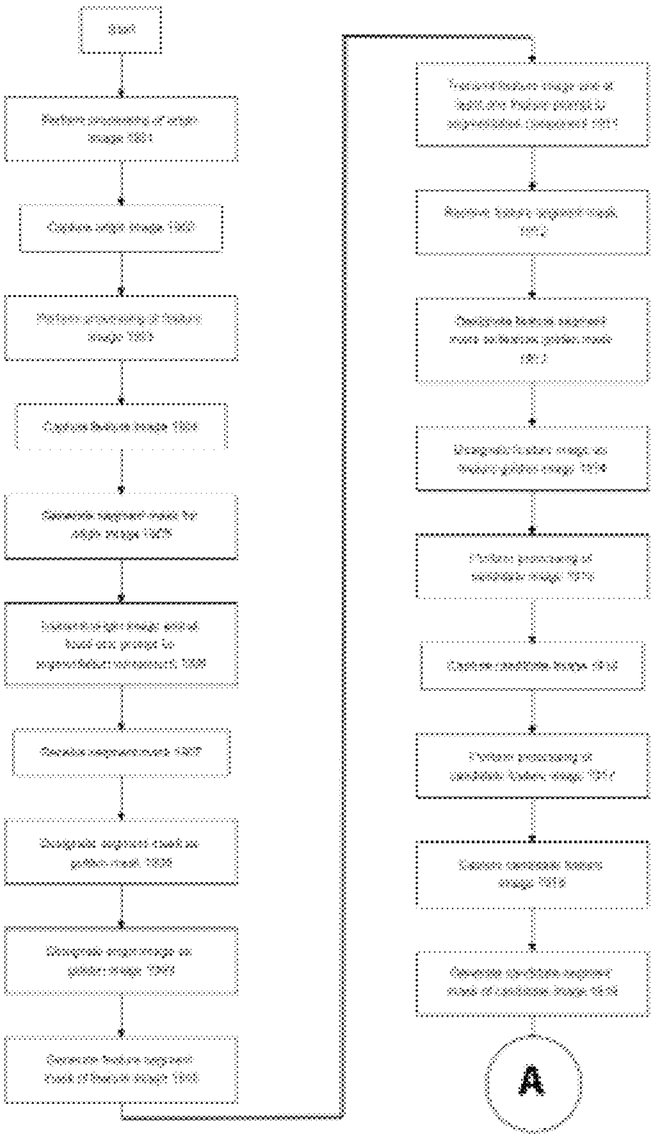
FIG. 19 is a flowchart of the capture, masking and matching process.

Turning now to FIG. 19, shown is a flowchart of the process. The process begins with the system ready to initiate the provenance verification workflow. At this point, no images have been captured, and no segment masks or matching operations have been performed. The system is simply prepared to acquire and process images of the object and its features. The system initiates the capture and processing of the object's origin image 1901. This origin image is a baseline representation of the object that will be used for future matching and provenance checks. A user or automated imaging device takes a photograph (or another form of image capture) of the object 1902. This is the first image in the workflow, establishing the origin state of the object that the system will reference going forward. After capturing the origin image, the system proceeds to capture and process an image of a feature on the object 1903. A feature could be any notable aspect, such as a unique marking, a label, or a component that helps identify the object. The user or system captures a separate image focusing on this specific feature 1904. This image, along with its corresponding metadata, will be processed and later paired with the origin image for comprehensive matching. The system now needs to isolate the object from its background or from other irrelevant visual data. A segment mask is generated for the origin image 1905. This mask highlights which pixels correspond to the object (versus the background). In order to create the segment mask, the system sends the origin image and at least one segmentation prompt (instructions or parameters) to the segmentation component 1906. This component is responsible for detecting and segmenting the main object from its environment. The segmentation component processes the provided information and returns a segment mask 1907. This mask delineates the boundaries of the object within the origin image. Since this is the very first mask for the object, the system designates it as the golden mask, effectively creating a reference standard for how the object should be recognized in subsequent scans 1908. Similarly, the origin image itself becomes the golden image 1909. This pair of the golden image and golden mask serves as the reference baseline for matching operations in the future.

Continuing with FIG. 19, the system proceeds to create a segment mask for the feature image 1910. Because the feature is also used in the identification and provenance of the object, the segmentation component must isolate this feature from any irrelevant background. Similar to how the origin image was processed, the feature image and relevant instructions are sent to the segmentation component to isolate the feature 1911. The segmentation component returns the feature segment mask, identifying the boundaries of the feature within the captured image 1912. Because this is the first feature mask, the system designates it as the feature golden mask, establishing it as the reference for that specific feature 1913. Likewise, this feature image is recorded as the feature golden image, creating a baseline for how the feature should appear in future scans 1914. The system then prepares to process a candidate image, which is a new image of the object captured at a later time or by a different user 1915. This candidate image will be compared to the golden image to see if it matches. A user or imaging device captures a new photograph of the object in its current state 1916. This image is submitted for segmentation and subsequent matching. The system also focuses on the candidate feature image, an updated image of the same feature to see if it still appears as it did in the golden reference 1917. The system captures a new photograph or image of the feature 1918. This will be compared against the golden feature image. Before the main matching operation, the candidate image must be segmented, just as the origin image was 1919. The system transmits the candidate image and a prompt to the segmentation component, which returns a segment mask.

Figure 20:
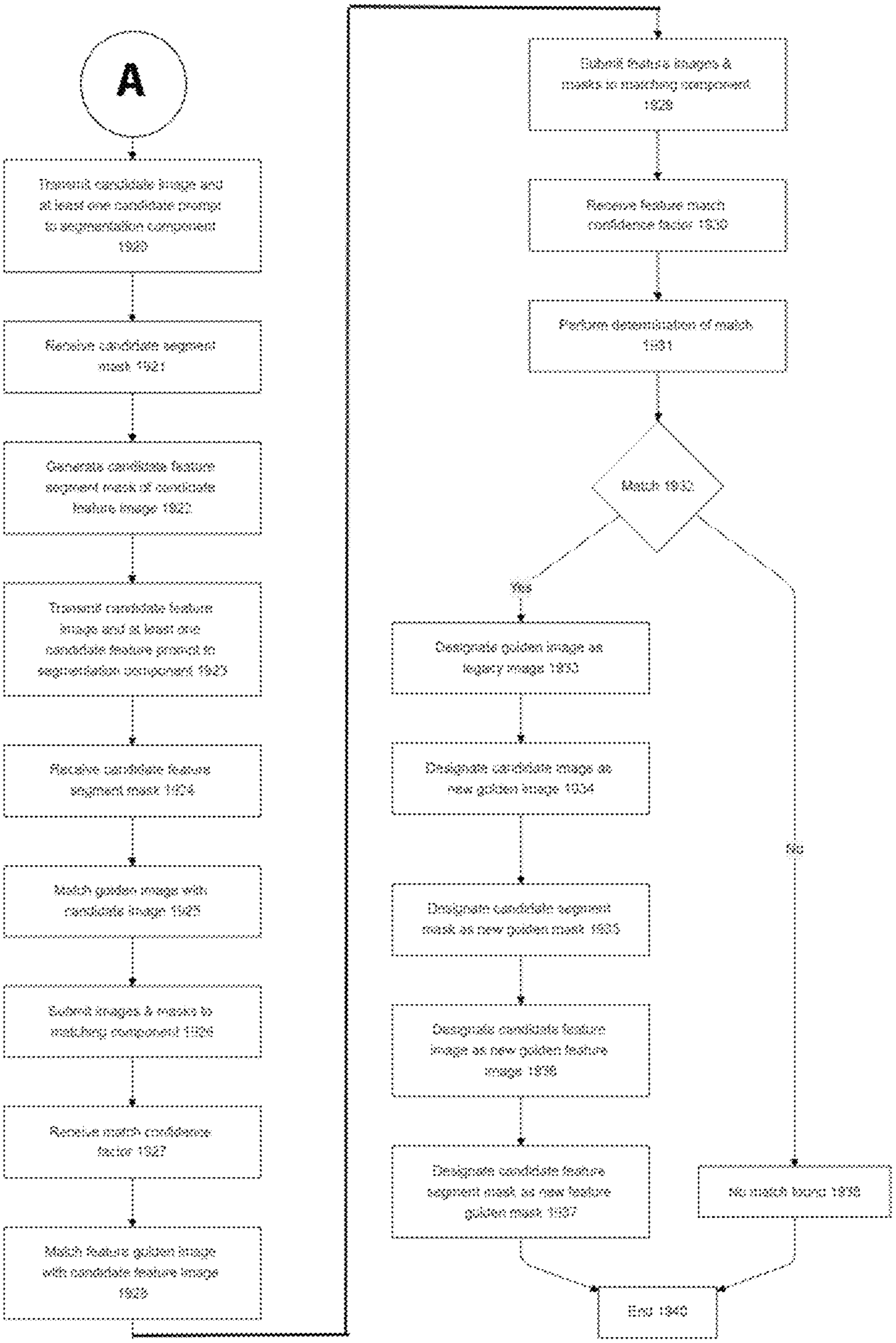
FIG. 20 is a continuation of the flowchart of the capture, masking and matching process.

FIG. 20 is a continuation of the flowchart of the process. In the next step, the system sends the newly captured candidate image with instructions to identify the object boundaries 1920. The segmentation component responds with the segmented mask, delineating the object's edges in the candidate image 1921. The system repeats the segmentation process for the candidate feature image to separate the feature from its background 1922. The candidate feature image and prompt is sent to the segmentation component for processing 1923. A mask isolating the candidate feature is returned, ready for matching against the feature golden reference 1924. Then the core matching step begins 1925. The system submits the golden image, golden mask, candidate image, and candidate segment mask to the matching component to receive a match confidence factor that reflects their similarity. All relevant data, including the images and their masks, are forwarded to the matching engine that computes the probability or confidence of a match 1926. The matching component returns a numerical score (or range) describing how closely the candidate image aligns with the golden image 1927. A similar matching operation is performed for the feature images: the golden feature image and feature golden mask are compared to the candidate feature image and its segment mask 1928. All relevant feature images and masks are again sent to the matching component 1929. The matching component provides a separate confidence score for the similarity between the original feature and its newly captured candidate counterpart 1930. After receiving both the match confidence factor and the feature match confidence factor, the system decides whether both the object-level and feature-level images indicate a successful match 1931.

Continuing with FIG. 20, the system checks if both confidence factors exceed predetermined thresholds 1932. If yes, it concludes that the candidate images match the golden references. When a match is confirmed, the previously stored golden image becomes a legacy image 1933, effectively archiving it, while the new candidate image 1934 and mask 1935 become the updated golden references 1933. The same logic applies to the feature images: the new candidate feature image 1936 and mask 1937 become the feature golden references. If either the object or the feature fails to meet the match confidence criteria, the system concludes that there is no match 1938. The golden references remain unchanged, and the process ends. The entire workflow finishes once the system either updates the golden references with the successful match data or determines that no match has been found. This closes the loop on the scanning and matching cycle for that particular object and feature set.

Figure 21:
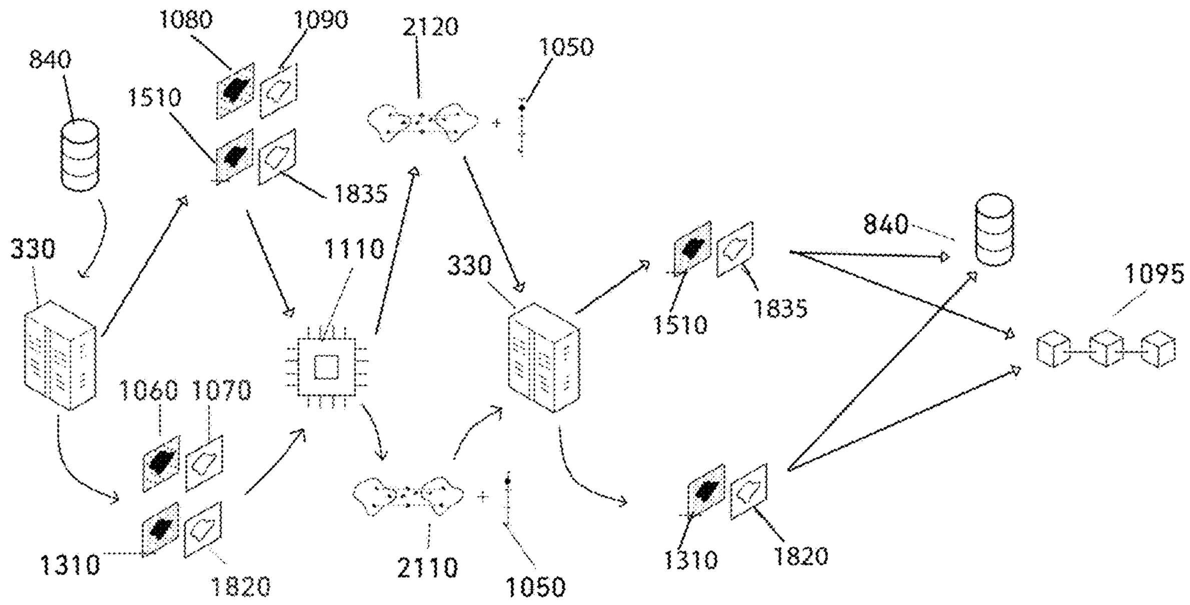
FIG. 21 is a flow diagram showing the matching process.

FIG. 21 shows the matching process. In one embodiment, the system compares the candidate image 1310 and golden image 1060 to determine if the candidate image 1310 is a valid representation of the object. The processing component 330 retrieves the golden image 1060, golden mask 1070, candidate image 1310 and candidate segment mask 1820 from the datastore 840 and submits the golden image 1060, golden mask 1070, candidate image 1310 and candidate segment mask 1820 to a matching component 1110 for processing. The matching component 1110 processes the inputs and returns a match image 2110 and a confidence factor 1050 to the processing component 330, which then stores the match image 2110 and confidence factor 1050 in the datastore 840. The processing component 330 then compares the confidence factor 1050 to a confidence threshold. If the confidence factor 1050 exceeds the confidence threshold, it is considered a match, and the processing component 330 designates the candidate image 1310 as the new golden image and the candidate segment mask 1820 as the new golden mask. In one embodiment, the processing component 330 then stores the candidate ID information, the candidate geolocation, the new golden image, and the new golden mask to the blockchain 1095.

Continuing with FIG. 21, in one embodiment, the system also compares the candidate feature image 1510 and feature golden image 1080 to determine if the candidate feature image 1510 is a valid representation of the feature. The processing component 330 retrieves the feature golden image 1080, feature golden mask 1090, candidate feature image 1510 and candidate feature segment mask 1835 from the datastore 840 and submits the feature golden image 1080, feature golden mask 1090, candidate feature image 1510 and candidate feature segment mask to a matching component 1110 for processing. The matching component 1110 processes the inputs and returns a feature match image 2120 and a confidence factor 1050 to the processing component 330, which then stores the feature match image 2120 and confidence factor 1050 in the datastore 840. The processing component 330 then compares the confidence factor 1050 to a confidence threshold. If the confidence factor 1050 exceeds the confidence threshold, it is considered a match, and the processing component 330 designates the feature candidate image 1510 as the new feature golden image and the candidate feature segment mask 1835 as the new feature golden mask. In one embodiment, the processing component 330 then stores the candidate ID information, the candidate geolocation, the new golden image, the new golden mask, the new feature golden image and the new feature golden mask to the blockchain 1095.

Continuing with FIG. 21, in one embodiment, before performing the matching process, the system classifies the object based on its physical characteristics, such as whether it is relatively static or more malleable (e.g., an item of clothing). Depending on this classification, the processing component 330 then adjusts the weighting of the respective confidence factors returned by the matching component 1110. For example, if the object is determined to be static—such as a flat artwork or photograph—then the overall match decision may place greater weight on the image confidence factor because variations in shape or arrangement are minimal. Conversely, if the object is relatively “floppy” or prone to different orientations—such as a T-shirt or other textile—it may be more difficult to maintain consistent positioning in each image, so the system increases the weight of the feature confidence factor. This ensures that the final assessment accounts for the likelihood that the object’s overall shape could vary substantially, yet its unique features (e.g., a logo or design) remain consistent across multiple representations.

After the system has established a golden image and its associated golden mask, and after a candidate image has undergone its own segmentation to produce a candidate mask, the platform seeks to determine whether the candidate truly represents the same physical object as the origin object. To achieve this, in one embodiment, the processing component leverages the matcher component, which uses advanced computer vision techniques, feature detection algorithms, and homography transformations to align and compare images with exceptional precision.

The matching process begins once the processing component retrieves the golden image and golden mask, along with the candidate image and candidate mask, from the datastore. These elements are then submitted to the matcher for analysis. The matcher isolates each object’s masked regions and identifies feature points, up to thousands per image, to anchor the comparison. By focusing on salient features, such as corners and distinctive patterns, the matcher can map corresponding points across the two images, even if they differ in perspective or lighting.

In one embodiment, the provenance system is integrated with logistics orchestration, chain-of-custody management, and support decisioning for physical items. It operates by tracking the provenance of an object and using that data to manage its movement and lifecycle. The system is composed of four main functional components.

Figure 22:
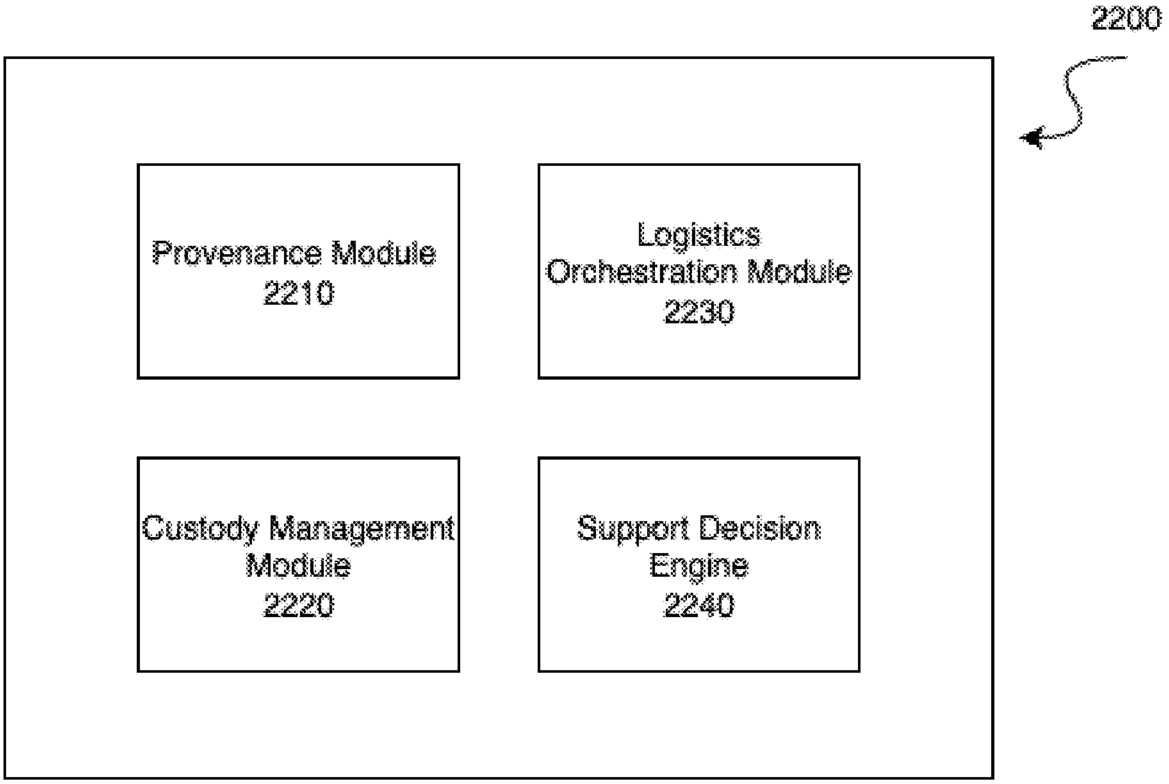
FIG. 22 is a block diagram of the logistics system.

Turning now to FIG. 22, the custody management module 2220 maintains a distributed ledger for each physical item, associated with a unique identifier. At every physical handoff, the system enforces a “check-in/check-out” protocol. This protocol requires multi-factor verification, including a scan of the item’s identifier, confirmation of the handler’s designated role, and validation of the transaction’s location via geofencing. During this process, condition reports and media evidence are captured and recorded in the item’s ledger. In one embodiment, media evidence includes golden images, candidate images and feature images. To authorize these transfers, the system generates handoff authorization tokens, which are digital tokens scoped to a specific time and geographic location. The validation of a handoff authorization tokens is a required step to complete a handoff event.

The logistics orchestration module 2230 handles packaging. Based on an item’s pre-determined risk profile, the system assigns a specific set of required packaging materials. To certify compliance, the system requires an operator to scan the Stock Keeping Units (SKUs) of the approved materials and to capture photographic evidence of the item in its packed state. The generation of a shipping label and the binding of an insurance policy are programmatically dependent on the successful completion of this packaging certification protocol.

The support decision engine 2240 manages return, refund, and repair (R/R/R) requests on a consumer's device. The system guides the user through a series of item-specific triage tests and evidence-capture steps. The engine then processes the collected data against a set of predefined policy rules to determine a support outcome, such as a refund, a field repair, or a return authorization. This determination is made before the item is physically shipped. If the outcome requires the item to be shipped, the system then utilizes the custody management and logistics orchestration components to issue a handoff authorization token and enforce the packaging protocol for the return journey.

Figure 23:
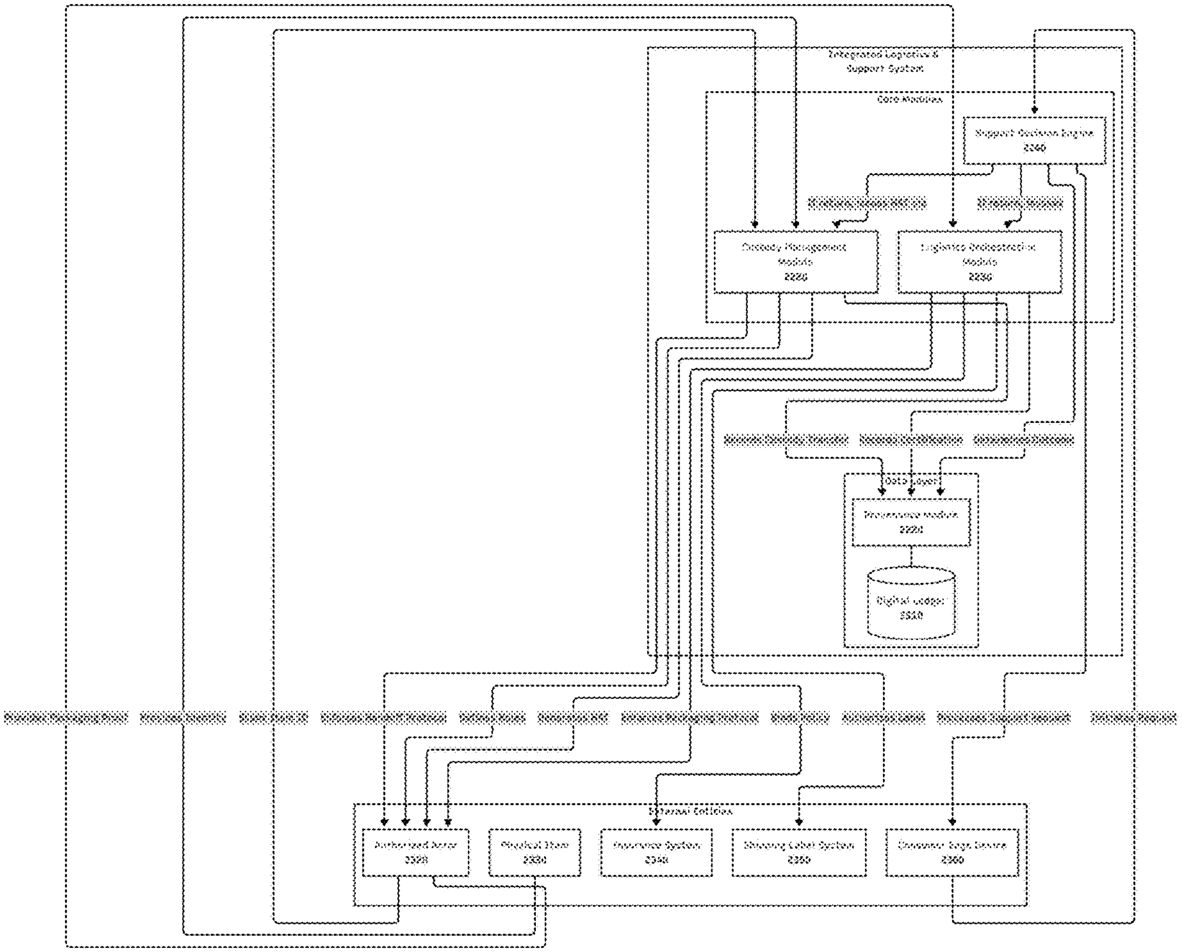
FIG. 23 is a detailed block diagram of the logistics system.

FIG. 23 illustrates a block diagram of an exemplary architecture for the integrated logistics and support system. The system orchestrates the management and movement of a physical item 2330 through interactions with various external entities, including authorized actors 2320 (e.g., sellers, packers, carriers), an external insurance system 2340, an external shipping label system 2350, and a consumer edge device 2360 (capture device, smartphone). The system architecture is built upon a foundational data layer comprising the provenance module 2220 and a distributed ledger 2310. The provenance module 2220 manages the distributed ledger 2310, which serves as a persistent and verifiable repository for the lifecycle data of the physical item 2330. The provenance module 2220 interfaces with the core modules to record custody transfers, record certifications, and record determined outcomes.

The core modules implement the primary logistics and support workflows. The custody management module 2220 is responsible for managing the secure transfer of the physical item 2330. It defines the roles of authorized actors 2320 and generates handoff authorization tokens. When an authorized actor 2320 provides their identity and scans the unique identifier of the physical item 2330, the custody management module 2220 enforces a strict handoff protocol. The logistics orchestration module 2230 manages shipment preparation by enforcing a packaging protocol, which requires the authorized actor 2320 to provide verifiable packaging proof (e.g., SKU scans, media artifacts). Upon successful verification of the packaging proof, the logistics orchestration module 2230 conditionally interacts with the insurance system 2340 to bind a policy and the shipping label system 2350 to authorize label generation.

The support decision engine 2240 manages post-sale interactions and reverse logistics decisioning. It processes support requests initiated from the consumer edge device 2360 and evaluates the inputs to determine an appropriate support outcome. If the support decision engine 2240 determines that a return shipment is required, it coordinates the reverse logistics process by instructing the custody management module 2220 to issue a handoff authorization token and invoking the logistics orchestration module 2230 to manage the packaging and shipment protocols for the return journey.

Figure 24:
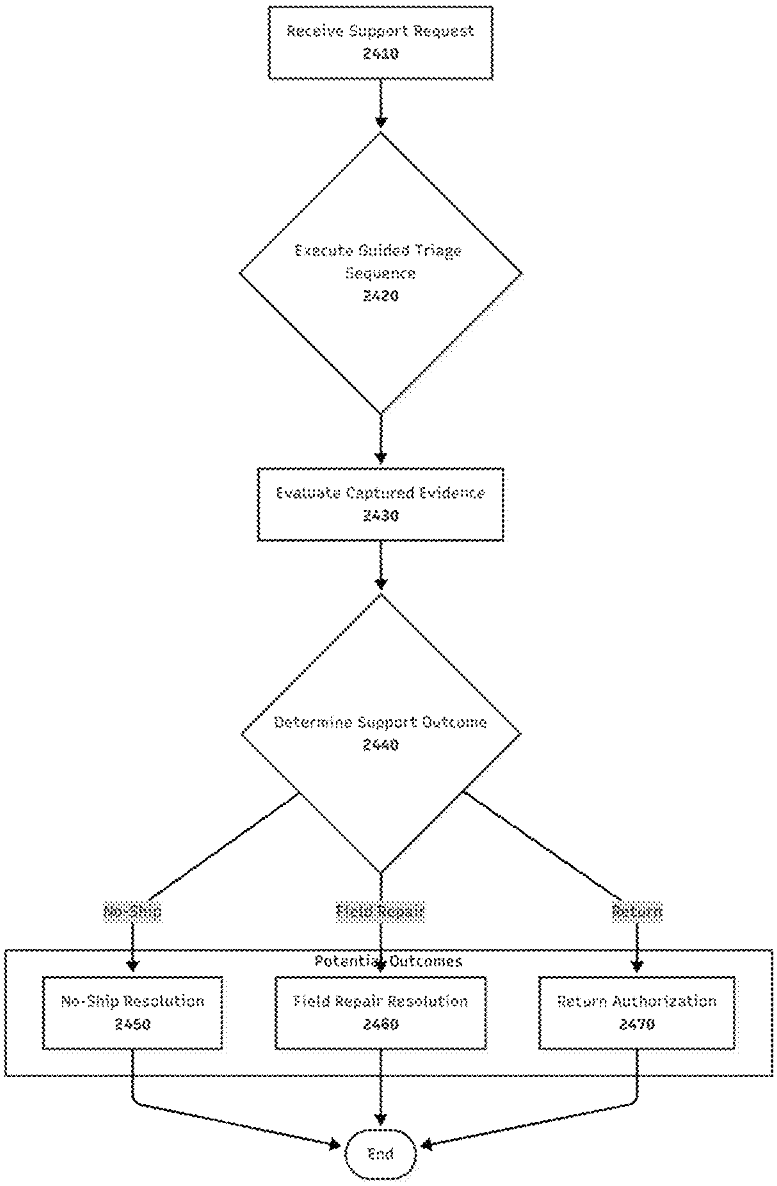
FIG. 24 is a flowchart of the evaluation process.

Turning now to FIG. 24, illustrated is a an exemplary computer-implemented method for decentralized support decisioning for a physical item. The process begins at step 2410, where the system receives a support request regarding the physical item. This request is typically initiated from a consumer edge device (e.g., a smartphone) and may be triggered by the consumer scanning the item's unique digital identifier. This scan links the specific item and the associated support request to the item's digital provenance ledger, which contains its historical lifecycle data.

At step 2420, the system executes a guided triage sequence. This sequence is deployed dynamically to the consumer edge device and prompts the user to perform specific diagnostic tests relevant to the item category and the reported issue. The sequence guides the user in capturing necessary evidence regarding the current condition of the physical item, which may include photos, videos, audio recordings, or sensor data captured via the edge device.

At step 2430, the system evaluates the captured evidence. This evaluation involves applying a set of predefined policy rules (e.g., merchant return policies, warranty terms, insurer guidelines) to the evidence collected during the triage sequence. Crucially, in various embodiments, the evaluation also involves comparing the newly captured evidence against the historical evidence stored in the item's provenance ledger. For example, the system may compare photos of alleged shipping damage against the packaging certification photos previously recorded, to verify the claim and identify when and where the damage may have occurred.

At decision step 2440, the system determines a support outcome based on the evaluation. The system automatically selects the optimal resolution from a plurality of potential outcomes. If the evaluation determines the issue can be resolved without shipping the item back (e.g., a cosmetic issue within tolerance, or a user error), the system proceeds to a No-Ship Resolution 2450 (e.g., issuing a refund, partial credit, or providing instructions). If the evaluation determines the item can be repaired by the user in the field, the system proceeds to a Field Repair Resolution 2460 (e.g., authorizing the shipment of a replacement part or toolkit). If the evaluation determines that the item must be shipped for repair, replacement, or depot evaluation, the system proceeds to a Return Authorization 2470. If a return is authorized, subsequent logistics orchestration processes (such as generating a handoff authorization token and enforcing packaging protocols for the return shipment) are initiated.

Figure 25:
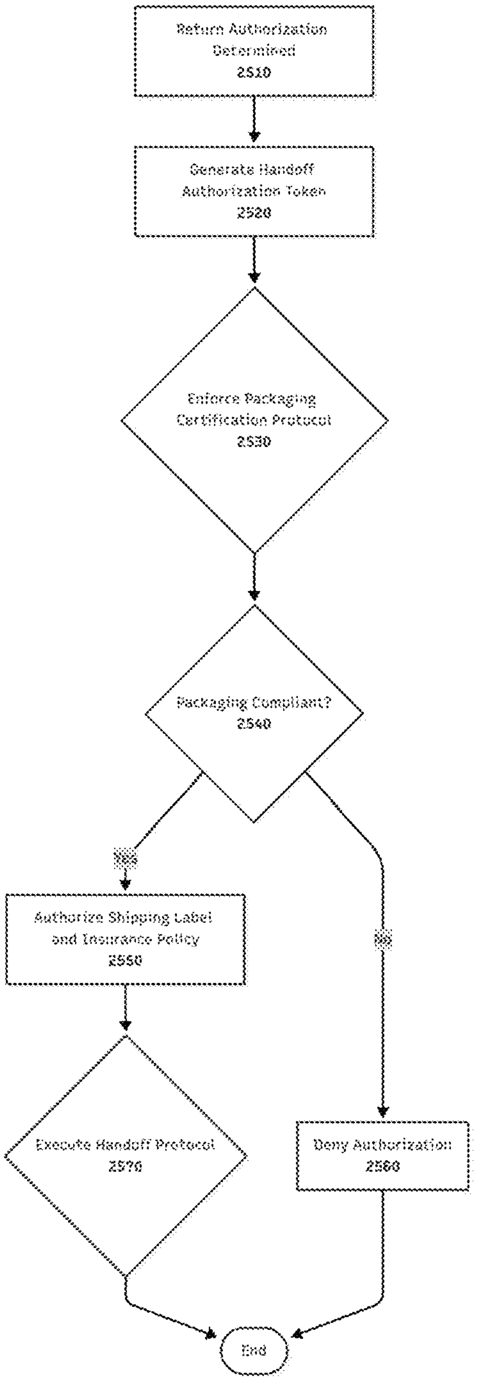
FIG. 25 is a flowchart of the compliance check process.

Turning now to FIG. 25, illustrated is an exemplary computer-implemented method for logistics orchestration, which follows the determination that a shipment is required (e.g., the Return Authorization outcome of FIG. 24). The process commences at step 2510, where a return authorization (or other shipment authorization) has been determined.

In response to the authorization, the system proceeds to step 2520 to generate a handoff authorization token. The handoff authorization token is a digital token configured to authorize the drop-off of the specific physical item. It is characterized by being time-scoped (having a limited validity duration) and geo-scoped (valid only within the geofence of a specific, authorized drop-off location, such as a certified carrier store).

At step 2530, the system enforces a packaging certification protocol. This protocol is executed when an actor presents the item at the authorized location. The system determines a required packaging recipe based on the item's risk tier and enforces compliance. Enforcement includes receiving and verifying the Stock Keeping Unit (SKU) identifiers of the packaging materials used. The system verifies that these SKUs comply with the recipe and, in various embodiments, explicitly prohibits the use of non-approved materials (e.g., reused boxes). The protocol further mandates the capture of media artifacts (e.g., photos, videos) of the item in its packed state.

At decision step 2540, the system determines if the packaging is compliant with the protocol based on the verified SKUs and captured media artifacts. If the packaging is not compliant ("No" path), the process proceeds to step 2560, where the authorization for shipment is denied. The item is programmatically prevented from entering the logistics stream until the packaging deficiencies are corrected and the protocol is successfully completed.

If the packaging is compliant at step 2540 ("Yes" path), the process proceeds to step 2550. In this critical gating step, the system conditionally authorizes the generation of a shipping label and the binding of an insurance policy. Authorization is contingent upon the successful, evidence-based verification of packaging compliance, thereby directly linking the physical risk mitigation (certified packaging) to the logistical initiation (labeling) and the financial risk transfer (insurance).

Finally, at step 2570, the system executes the handoff protocol to record the transfer of custody of the physical item to the logistics provider. This execution requires multi-factor verification, including: validating the handoff authorization token generated in step 2520; receiving a scan of the item's unique digital identifier; verifying the authorized role of the actor performing the handoff; and confirming that the scan occurred within the geofence defined by the handoff authorization token. The results of the packaging certification and the execution of the handoff protocol are recorded in the digital distributed provenance ledger.

Figure 26:
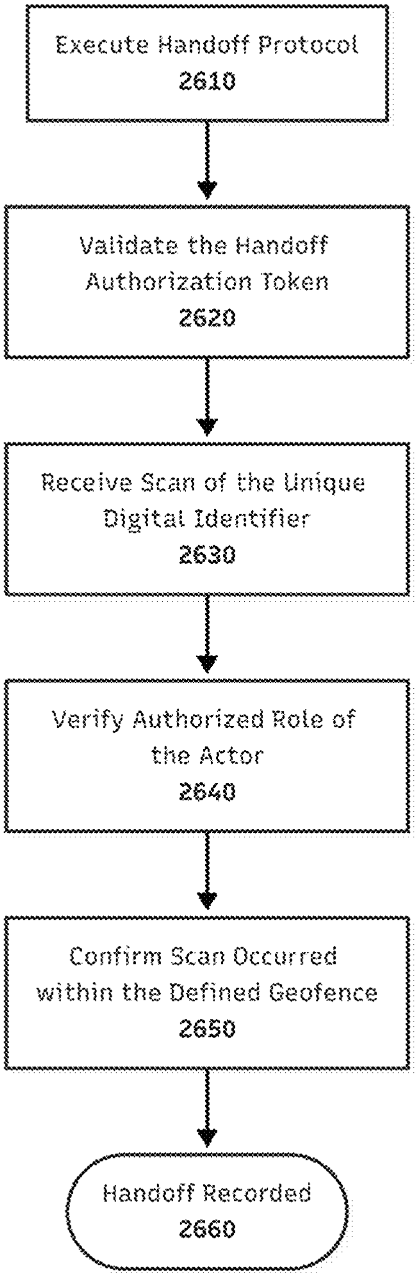
FIG. 26 is a flowchart of the handoff process.

Turning now to FIG. 26, illustrated is are the steps involved in executing the handoff protocol, ensuring a verifiable chain of custody during the transfer of a physical item. This corresponds, for example, to the protocol executed in step 2570 of FIG. 25.

The process begins at step 2610, initiating the execution of the handoff protocol. This protocol is invoked whenever a physical item is transferred between authorized actors (e.g., from a seller to a carrier, carrier-to-carrier, or a carrier to a buyer).

At step 2620, the system validates the handoff authorization token. The system verifies that the handoff authorization token is active (i.e., not expired or previously used, depending on the configuration) and corresponds to the specific transaction authorized for the handoff.

At step 2630, the system receives a scan of the unique digital identifier associated with the physical item being transferred. This confirms the presence of the item and ensures that the correct item is being handed off. If the scanned identifier does not match the identifier associated with the handoff authorization token or the underlying work order, the protocol fails.

At step 2640, the system verifies the authorized role of the actor performing the handoff. The system confirms the digital identity of the actor (e.g., via login credentials or device authentication) and determines if their assigned role (e.g., 'Certified Packer', 'Carrier Driver') is authorized to participate in this specific handoff event.

At step 2650, the system confirms that the scan occurred within the defined geofence. Using location data from the device performing the scan (e.g., GPS coordinates), the system verifies that the physical location of the handoff event matches the authorized location, which is typically defined by the geo-scope parameters of the handoff authorization token validated in step 2620.

Upon successful completion of all verification steps (2620-2650), the process concludes at step 2660, where the handoff is officially recorded. The system updates the digital provenance ledger to reflect the successful transfer of custody, including the timestamp, verified location, involved actors, and any associated condition reports or media artifacts captured during the event. If any step fails, the handoff is programmatically blocked and not recorded, maintaining the integrity of the chain of custody.

In one embodiment, the handoff authorization token is implemented using the JSON Web Token (JWT) standard, which provides a secure and self-contained method for handling authorizations. These tokens are digitally signed to ensure their authenticity and integrity, and they carry a payload of data, known as "claims," that define the specific parameters for a handoff. The payload combines standard JWT claims with custom claims tailored for logistics orchestration. Standard claims enforce the token's lifecycle, such as an expiration time (exp) to make it time-scoped and a unique JWT ID (jti) to ensure it can only be used once. The payload also identifies the issuing system (iss) and the specific physical item being transferred (sub).

To manage the physical constraints of the handoff, the handoff authorization token includes several custom claims. The authorized location is defined by a precise latitude (geo_lat) and longitude (geo_lon), with a specified radius in meters (geo_radius_m) establishing an exact geofence. Furthermore, a claim for authorized_roles contains a list of the specific actor roles, such as "CertifiedPacker," that are permitted to accept custody of the item using that particular token. This ensures that the transfer happens at the right place and is handled by the correct personnel.

The token's lifecycle begins with its generation, or "minting." When a shipment is authorized, the custody management module gathers the necessary context, including the item's ID, the approved location coordinates, the required roles, and a set expiration time. This information is assembled into a JWT payload, which is then cryptographically signed with a secure key. The resulting HAT is delivered to the authorized actor, often displayed as a QR code within an application for easy scanning.

In one embodiment, the JWT payload would be as follows:

```
payload={
  #Standard JWT Claims
  "exp": expiration_time,
  "iat": datetime.datetime.utcnow( )
  "jti": token_id,
  "sub": item_id,
  "iss": "LogisticsOrchestrator",
  #Custom handoff authentication claims (Geo-scoping
    and Roles)
  "geo_lat": authorized_location['lat'],
  "geo_lon": authorized_location['lon'],
  "geo_radius_m": authorized_location['radius_m'],
  "authorized_roles": authorized_roles
}
```

During the handoff event, the system executes a rigorous validation process to authorize the transfer. First, it verifies the token's digital signature to confirm it has not been tampered with. The system then checks that the token is not expired and performs a geofence check by comparing the device's current GPS coordinates to the location defined in the token's payload. Finally, it conducts a context check to ensure the scanned item ID matches the token's subject and the actor's role is permitted. As a last step, it verifies the token's unique ID has not been previously used and, if valid, records it as spent. The handoff is authorized only after all of these checks are successfully completed.

Figure 27:
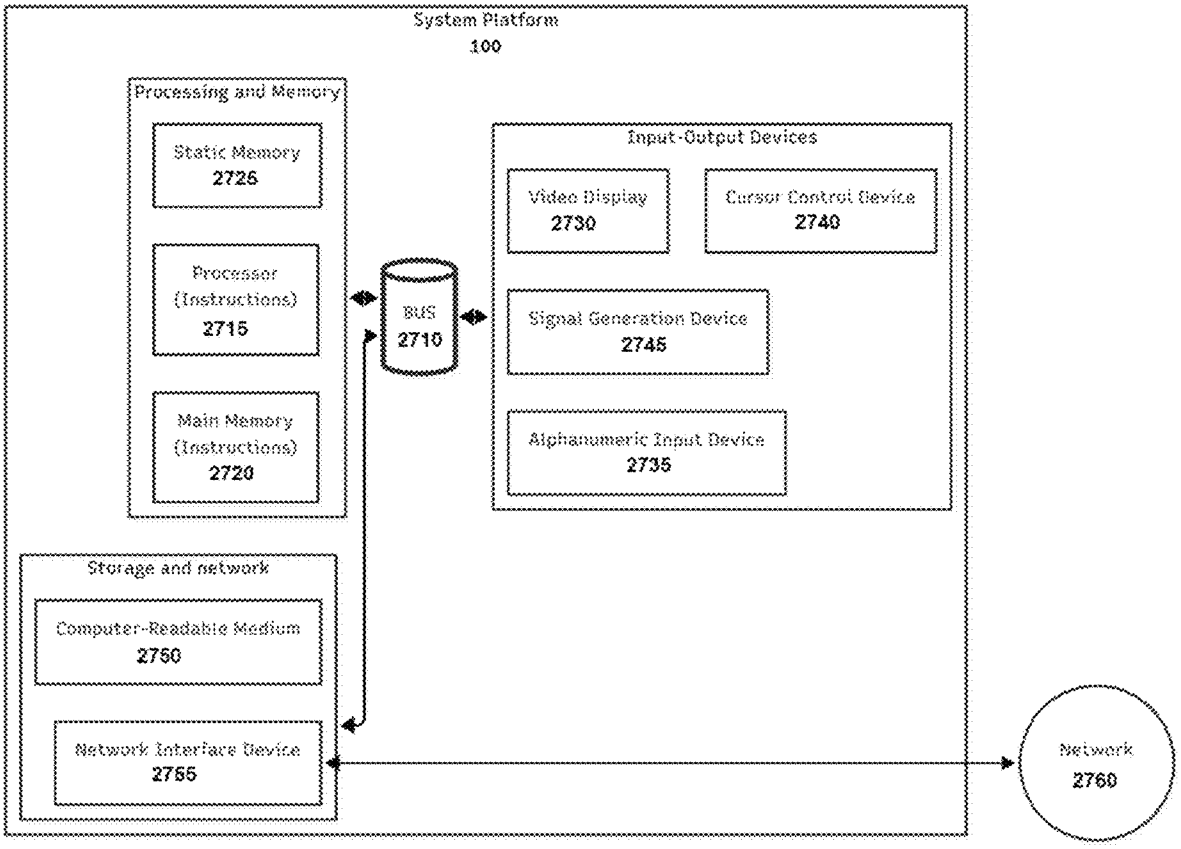
FIG. 27 is a block diagram of a system.

Turning now to FIG. 27, shown is a block diagram illustrating an example system platform 100 that may be used to implement one or more of the disclosed embodiments. For example, system platform 100 may be used as or in conjunction with the functions, processes, or methods described herein, and may represent the hardware components of the system platform 100, user systems 2740, or external systems described in other figures. System platform 100 can be a server, a personal computer, a mobile device, or any other processor-enabled device capable of data communication. The system platform 100 comprises several major subsystems, including Processing and Memory, Storage and Network, and Input-Output Devices. These subsystems are communicatively coupled via a central bus 2710.

The Processing and Memory subsystem includes one or more processors 2715 for executing instructions, a main memory 2720 that provides storage for instructions and data for programs executing on the processor 2715, and a static memory 2725. Main memory 2720 is typically a volatile, semiconductor-based memory such as dynamic random access memory (DRAM) or static random access memory (SRAM). Static memory 2725 is typically a non-volatile memory, such as read-only memory (ROM), for storing firmware or other instructions that persist when the system is powered off. The processor 2715, main memory 2720, and static memory 2725 are interconnected via the bus 2710.

The Storage and Network subsystem includes a computer-readable medium 2750 and a network interface device 2755. The computer-readable medium 2750 is a non-transitory medium, such as a magnetic hard disk, a solid-state drive (SSD), or other forms of secondary memory, used for long-term storage of data and computer-executable code. The network interface device 2755, which may be a network interface card (NIC), a modem, or a wireless adapter, allows the system platform 100 to communicate with external devices and systems over a network 2760.

The Input-Output Devices subsystem provides interfaces for user interaction and for presenting information. This subsystem can include a video display 2730 (e.g., an LCD or LED monitor), an alphanumeric input device 2735 (e.g., a keyboard), a cursor control device 2740 (e.g., a mouse, trackball, or touchpad), and a signal generation device 2745 (e.g., a speaker or haptic feedback motor). These devices are connected to the other components of the system platform 100 via the bus 2710, allowing the processor 2715 to receive input and send output.

The bus 2710 represents one or more communication buses or data channels that facilitate information transfer between the various components of the system platform 100. The bus 2010 may include a data bus, an address bus, and a control bus, and can be implemented using any standard or non-standard bus architecture, such as PCI, USB, or others.

Figure 28:
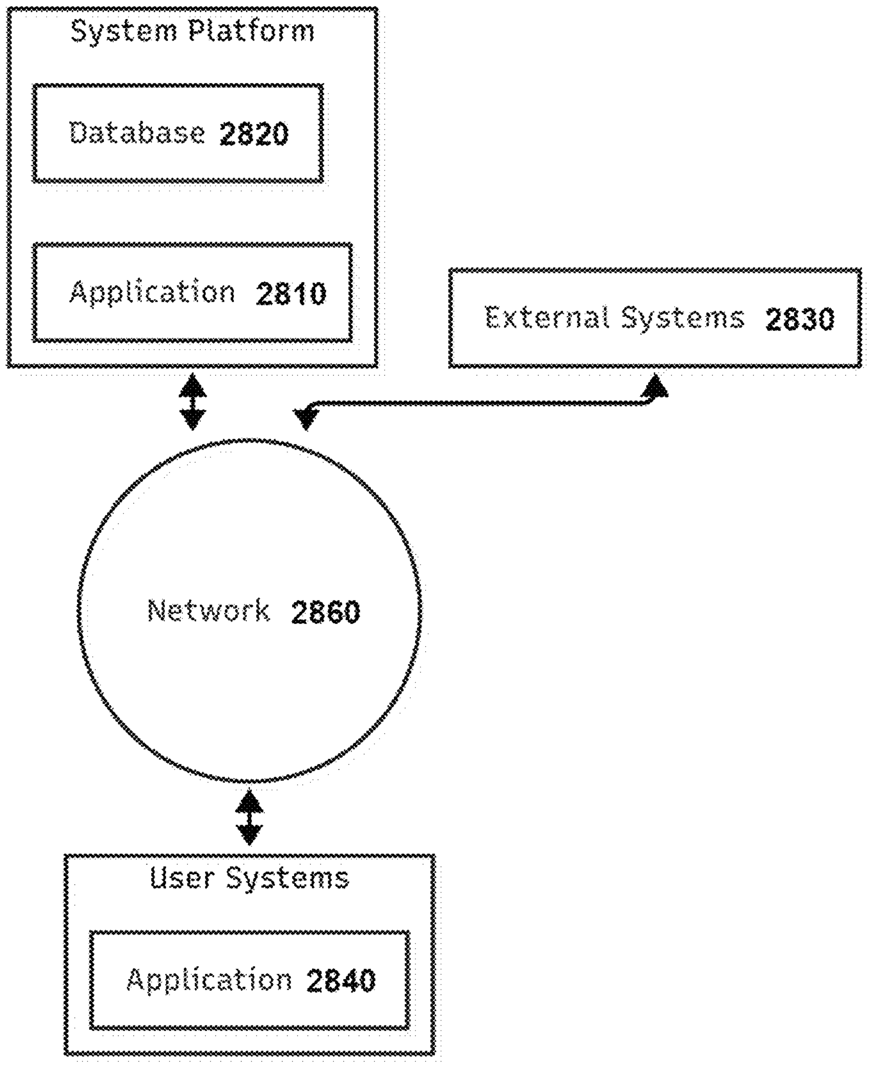
FIG. 28 is a block diagram of a system connected to a network.

FIG. 28 illustrates an example infrastructure in which one or more of the disclosed processes may be implemented, according to an embodiment. The infrastructure comprises a system platform, one or more user systems, and one or more external systems 2830, which are all communicatively connected via a network 2860. The system platform 100 may be implemented using the hardware architecture described above.

The system platform hosts an application 2810 and a database 2820. Application 2810 may comprise one or more server-side software modules that implement the backend processes, methods, and functionality described herein. Database 2820 provides persistent storage for data used by the application 2810, such as user data, system configurations, and other operational data. The system platform communicates bidirectionally with the network 2860 to interact with other connected systems.

User systems may comprise any type of computing device, such as a desktop computer, laptop, or mobile device, and may be implemented using the hardware described in above. Each user system may execute its own application 2840, which can be a client application (e.g., a web browser or a dedicated mobile app) that provides a user interface for interacting with the application 2810 on the system platform. The connection between user systems 2840 and the network 2860 is bidirectional, allowing for requests to be sent to the system platform 100 and for data to be received in response.

The network 2860 may comprise the Internet, a local area network (LAN), a wide area network (WAN), or any combination thereof. Communication across the network 2860 may use standard protocols such as TCP/IP, HTTP, and HTTPS. The infrastructure may also include one or more external systems 2830, which could be third-party platforms, services, or data sources that interact with the system platform. For example, the application 2810 may query an external system 2830 for data via an API call over the network 2860.

Figure 29:
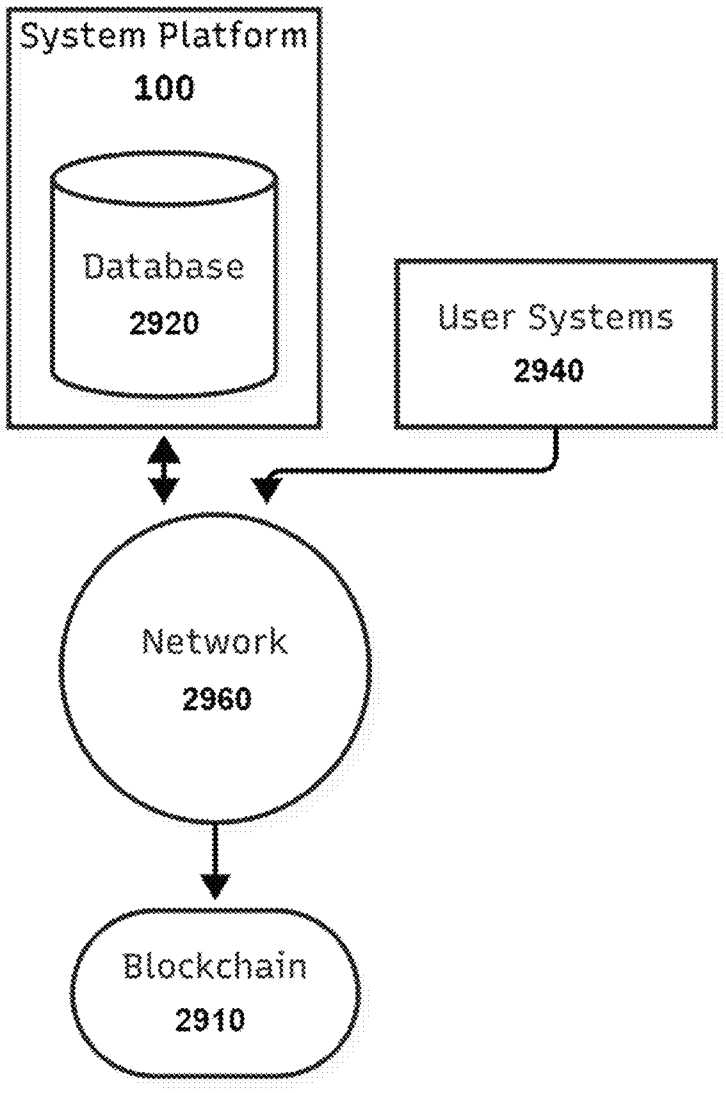
FIG. 29 is a block diagram of a system connected to a network and a blockchain.

FIG. 29 illustrates another example infrastructure in which one or more of the disclosed processes may be implemented, according to an embodiment. This infrastructure integrates a blockchain 2910 as a core component. The architecture includes a system platform 100 and one or more user systems 2940, both communicatively connected via a network 2960 to each other and to the blockchain 2910.

The system platform 100, which can be implemented using the hardware components detailed in above, contains a database 2920. The system platform 100 interacts with the network 2960 to both serve the user systems 2940 and to communicate with the blockchain 2910. For instance, the system platform 100 may read data from or write transaction data to the blockchain 2910. The connection between the system platform 100 and the network 2960 is bidirectional.

User systems 2940 allow users to interact with the system platform 100 and, by extension, the blockchain 2910. The user systems 2940 connect to the network 2960 to send requests and receive data. The network 2960 acts as the communication layer connecting all entities. A feature of this architecture is the blockchain 2910, which may be a public or private distributed ledger. The system platform 100 and user systems 2940 can leverage the blockchain 2910 for purposes such as secure, immutable data recording, asset tracking, or executing smart contracts. The directional arrows indicate that data flows from the system platform 100 through the network 2960, with some of this data being directed to the blockchain 2910 for processing and storage.

While certain embodiments have been described above, it will be understood that the embodiments described are by way of example only. Accordingly, the systems and methods described herein should not be limited based on the described embodiments. Rather, the systems and methods described herein should only be limited in light of the claims that follow when taken in conjunction with the above description and accompanying drawings.

It should be further understood that the examples and embodiments pertaining to the systems and methods disclosed herein are not meant to limit the possible implementations of the present technology. Further, although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the Claims.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A system for integrated logistics orchestration, the system comprising:

one or more processors; and a non-transitory computer-readable medium storing instructions that, when executed by the one or more processors, configure the system to implement:

a provenance module configured to:

maintain a distributed ledger associated with a unique identifier for a physical item, wherein the unique identifier comprises a digital fingerprint of the physical item generated by a computer vision pipeline configured to capture, via a capture device, one or more images of the physical item, segment the physical item from a background to produce a golden mask, extract a set of features of the physical item, and composite a golden image of the physical item, the golden image and the golden mask being stored in the distributed ledger; and record ownership transfers and condition reports in the distributed ledger; and verify an identity of the physical item upon a subsequent interaction by capturing a candidate image of the physical item via the capture device, generating a candidate mask, and comparing the candidate image and the candidate mask against the golden image and the golden mask stored in the distributed ledger to determine whether the candidate image represents the same physical item;

a custody management module configured to:

define authorized actors and associated roles;

generate a handoff authorization token, wherein the handoff authorization token is time-scoped and geo-scoped to an authorized location; and enforce a handoff protocol for recording a custody transfer event in the distributed ledger;

a logistics orchestration module configured to:

determine a risk tier for the physical item;

enforce a packaging certification protocol based on the risk tier wherein the packaging certification protocol comprises:

verifying stock keeping unit identifiers of approved packaging materials;

capturing media artifacts of the physical item in a packed state;

determining compliance with the packaging certification protocol; and only upon determining compliance with the packaging certification protocol, binding an insurance policy and authorizing generation of a shipping label;

a support decision engine configured to:

process a support request initiated via the capture device;

guide a consumer through an item-specific triage test and evidence capture;

evaluate the evidence capture against a support policy;

determine a support outcome pursuant to the support policy prior to authorizing a shipment of the physical item; and if the support outcome requires shipment, utilize the custody management module to issue the handoff authorization token and invoke the logistics orchestration module to enforce the packaging certification protocol for the shipment.

2. The system of claim 1, wherein the handoff protocol comprises:

validation of the handoff authorization token;

a scan of the unique identifier;

verification of the authorized actor and the associated role; and confirmation that the scan occurred within the geofence defined by the handoff authorization token.

3. The system of claim 1, wherein condition reports further include associated media artifacts.

4. The system of claim 1, wherein the distributed ledger is a blockchain.

5. The system of claim 1, wherein the logistics orchestration module is further configured to determine the risk tier based on at least one of the physical item's size, weight, fragility, or uniqueness.

6. The system of claim 1, wherein the handoff protocol is further configured to trigger an exception handling workflow upon detection of a condition discrepancy during the custody transfer event.

7. The system of claim 1, wherein the support decision engine is further configured to determine the support outcome from a plurality of outcomes comprising a no-ship resolution, a field repair resolution, and a return authorization.

8. A computer-implemented method for logistics orchestration for a physical item, the method comprising:

receiving, by a computing system comprising one or more processors, a support request regarding the physical item, the request initiated from a capture device, wherein the physical item is associated with a unique identifier linked to a distributed ledger, wherein the unique identifier comprises a digital fingerprint of the physical item generated by a computer vision pipeline that captures, via the capture device, one or more images of the physical item, segments the physical item from a background to produce a golden mask, extracts a set of features of the physical item, and composites a golden image of the physical item, the golden image and the golden mask being stored in the distributed ledger;

executing, by the computing system, a guided triage sequence on the capture device, the sequence configured to prompt a user to perform diagnostic tests on the physical item and capture evidence regarding a condition of the physical item;

verifying, by the computing system, an identity of the physical item by capturing a candidate image of the physical item via the capture device, generating a candidate mask, and comparing the candidate image and the candidate mask against the golden image and the golden mask stored in the distributed ledger to determine whether the candidate image represents the same physical item;

evaluating, by the computing system, the captured evidence against a support policy;

determining, based on the evaluation, a support outcome selected from a plurality of potential outcomes, wherein the plurality of potential outcomes includes at least:

a no-ship resolution;

a field repair resolution; and a return authorization requiring shipment of the physical item;

responding to determining that the support outcome is the return authorization requiring shipment of the physical item;

generating a handoff authorization token, wherein the handoff authorization token is time-scoped and geo-scoped to an authorized drop-off location;

enforcing a packaging certification protocol at the authorized drop-off location prior to custody transfer;

conditionally authorizing the generation of a shipping label and the binding of an insurance policy only upon successful verification of compliance with the packaging certification protocol;

executing a handoff protocol to record transfer of custody of the physical item to a logistics provider in the distributed ledger.

9. The method of claim 8, wherein the enforcing comprises:

assigning a risk tier to the physical item;

determining a required packaging recipe based on the risk tier of the physical item;

receiving scans of stock keeping unit identifiers of packaging materials used;

verifying that the received stock keeping unit identifiers comply with the required packaging recipe; and receiving media artifacts of the physical item in a packed state.

10. The method of claim 9, wherein verifying that the received stock keeping unit identifiers comply with the required packaging recipe further comprises prohibiting the use of reused packaging materials.

11. The method of claim 8, wherein executing the handoff protocol comprises:

validating the handoff authorization token;

receiving a scan of the unique digital identifier;

verifying an authorized role of an actor performing the handoff; and confirming the scan occurred within the geofence defined by the handoff authorization token.

12. The method of claim 8 further comprising updating the distributed ledger to record the support outcome, the captured evidence from the triage sequence, the results of the packaging certification protocol, and the execution of the handoff protocol.

13. The method of claim 8, wherein evaluating the captured evidence further comprises evaluating the captured evidence in conjunction with historical data from the distributed ledger associated with the physical item.

14. The method of claim 8, wherein the captured evidence comprises a candidate image of the physical item, and wherein evaluating the captured evidence comprises comparing the candidate image to a golden image of the physical item previously stored in the distributed ledger.

15. The method of claim 8, wherein the no-ship resolution is selected from the group consisting of a partial credit and a keep-it refund.

16. The method of claim 8, further comprising, in response to the successful verification of compliance with the packaging certification protocol, generating a unique seal identifier and recording the unique seal identifier in the distributed ledger.

* * * * *